United States Patent
Trafton et al.

(10) Patent No.: US 9,405,441 B2
(45) Date of Patent: Aug. 2, 2016

(54) POOL DATA STORAGE SYSTEM AND METHOD

(71) Applicants: Scott M. Trafton, Bennington, VT (US); Todd W. Trafton, Wells, ME (US)

(72) Inventors: Scott M. Trafton, Bennington, VT (US); Todd W. Trafton, Wells, ME (US)

( * ) Notice: Subject to any disclaimer, the term of this patent is extended or adjusted under 35 U.S.C. 154(b) by 241 days.

(21) Appl. No.: 13/902,126

(22) Filed: May 24, 2013

(65) Prior Publication Data

US 2013/0318461 A1    Nov. 28, 2013

Related U.S. Application Data

(60) Provisional application No. 61/651,800, filed on May 25, 2012.

(51) Int. Cl.

| | |
|---|---|
| *G06F 17/00* | (2006.01) |
| *G06F 3/0484* | (2013.01) |
| *G06F 17/30* | (2006.01) |
| *G06F 17/22* | (2006.01) |
| *G06F 9/54* | (2006.01) |
| *G06F 17/24* | (2006.01) |
| *G06Q 10/00* | (2012.01) |
| *G06Q 50/06* | (2012.01) |

(52) U.S. Cl.
CPC .............. *G06F 3/0484* (2013.01); *G06F 9/543* (2013.01); *G06F 17/2205* (2013.01); *G06F 17/243* (2013.01); *G06F 17/30312* (2013.01); *G06Q 10/20* (2013.01); *G06Q 50/06* (2013.01)

(58) Field of Classification Search
CPC ... G06F 17/243; G06F 17/2205; G06F 9/543; G06F 17/30312; G06F 3/0484; G06Q 10/20; G06Q 50/06
See application file for complete search history.

(56) References Cited

U.S. PATENT DOCUMENTS

| | | | |
|---|---|---|---|
| 5,895,565 A | 4/1999 | Steininger et al. | |
| 6,003,164 A | 12/1999 | Leaders | |
| 6,377,868 B1* | 4/2002 | Gardner, Jr. | 700/236 |
| 7,292,898 B2 | 11/2007 | Clark et al. | |
| 8,819,223 B2* | 8/2014 | Talbert | 709/224 |
| 2006/0054569 A1* | 3/2006 | Kulperger | 210/755 |
| 2008/0039977 A1 | 2/2008 | Clark et al. | |
| 2008/0311898 A1 | 12/2008 | Benco et al. | |
| 2009/0049057 A1* | 2/2009 | Ghani | 707/10 |

(Continued)

FOREIGN PATENT DOCUMENTS

| | | |
|---|---|---|
| RU | 101199 U1 | 1/2011 |
| RU | 109126 U1 | 10/2011 |

*Primary Examiner* — William Bashore
*Assistant Examiner* — James F Sugent
(74) *Attorney, Agent, or Firm* — Schmeiser, Olsen & Watts, LLP

(57) ABSTRACT

Disclosed herein is a system that includes a server hosting a pool data receiving and storage service. The system further includes a database in communication with the server. Still further, the system includes a user communication device in communication with the server having an interface configured interact with the pool data receiving and storage service hosted by the server, the interface configured to receive a manual user input of a pool related data, the interface configured to transmit the pool related data to the server. The pool related data corresponds to chemical levels in a pool. The pool data receiving and storage service of the server is configured to receive the pool related data from the user communication device and store the pool related data in the database. The interface of the user communication device is configured to access the pool related data through communication with the server.

17 Claims, 23 Drawing Sheets

(56) References Cited

U.S. PATENT DOCUMENTS

| | | |
|---|---|---|
| 2010/0125474 A1* | 5/2010 | Harmon et al. .................... 705/7 |
| 2010/0230365 A1* | 9/2010 | Hill et al. ....................... 210/744 |
| 2011/0006904 A1 | 1/2011 | Duchamp et al. |
| 2011/0082595 A1* | 4/2011 | Mehus et al. ................. 700/283 |
| 2012/0078426 A1 | 3/2012 | Macey |
| 2012/0185571 A1* | 7/2012 | Uy ................................ 709/219 |
| 2012/0234696 A1* | 9/2012 | Mosley et al. ................ 205/775 |
| 2012/0267257 A1* | 10/2012 | Palmer et al. ................. 205/751 |
| 2013/0161267 A1* | 6/2013 | Palmer et al. ............ 210/748.18 |
| 2013/0166339 A1* | 6/2013 | Reese et al. .................. 705/7.13 |
| 2013/0265173 A1* | 10/2013 | Millar ...................... 340/870.07 |
| 2014/0018971 A1* | 1/2014 | Ellis et al. .................... 700/297 |

\* cited by examiner

POOL DATA STORAGE SYSTEM AND METHOD

This application claims priority to provisional patent application No. 61/651,800 filed May 25, 2012, and entitled "POOL DATA STORAGE SYSTEM AND METHOD," the disclosure of which is hereby incorporated by reference to the extent that it is not inconsistent with the present disclosure.

FIELD OF THE INVENTION

The subject matter disclosed herein relates generally to an internet based solution for data storage, access, and display. More particularly, the subject matter relates to an internet solution for storing and retrieving chemical and operational data on swimming pools, hot-tubs, spa's, water parks and other swimming facilities.

BACKGROUND OF THE INVENTION

Public swimming pools, hot-tubs, spa's, water parks, and the like all need to be monitored at periodic intervals in order to comply with safety regulations. In particular, these swimming facilities need to periodically be checked for measurements such as chlorine levels, bromine levels, salt levels, pH levels, alkalinity, temperature, and the like. It is often necessary for owners of swimming facilities to keep a log of these measurements to satisfy governmental regulations, and potentially to avoid liability. Currently, many owners of swimming facilities unreliably keep track of this information with a pencil and paper, or sometimes not at all.

Thus, internet solution for storing and retrieving chemical and operational data on swimming pools, hot-tubs, spa's, water parks and other swimming facilities would be well received in the art.

BRIEF DESCRIPTION OF THE INVENTION

According to one aspect, a system comprises: a server hosting a pool data receiving and storage service; a database in communication with the server; and a user communication device in communication with the server having an interface configured interact with the pool data receiving and storage service hosted by the server, the interface configured to receive a manual user input of a pool related data, the interface configured to transmit the pool related data to the server the pool related data corresponding to chemical levels in a pool, wherein the pool data receiving and storage service of the server is configured to receive the pool related data from the user communication device and store the pool related data in the database, and wherein the interface of the user communication device is configured to access the pool related data through communication with the server.

A system comprises: a web server; a database in communication with the web server; and a plurality of mobile communication devices in remote communication with the web server; wherein the web server is configured to host an interface that is accessible by the plurality of mobile communication devices, wherein the interface permits users of the plurality of mobile communication devices to manually input pool related data corresponding to chemical levels in a pool, wherein the web server is configured to store the pool related data in the database, wherein the interface is configured to permit the plurality of mobile communication devices to manually access the pool related data stored in the database.

A method comprises: providing a web server; providing a database; communicating between the web server and the database; providing a mobile communication device; remotely communicating between the mobile communication device and the web server; hosting, with the web server, an interface; accessing the interface with the mobile communication device; manually inputting into the interface, with the mobile communication device, pool related data corresponding to chemical levels in a pool; receiving the manually inputted pool related data by the web server; storing the received and manually inputted pool related data in the database; and accessing the manually inputted, received and stored pool related data by the user from the mobile communication device using the interface.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

A detailed description of the hereinafter described embodiments of the disclosed apparatus and method are presented herein by way of exemplification and not limitation with reference to the Figures.

Figure 1:
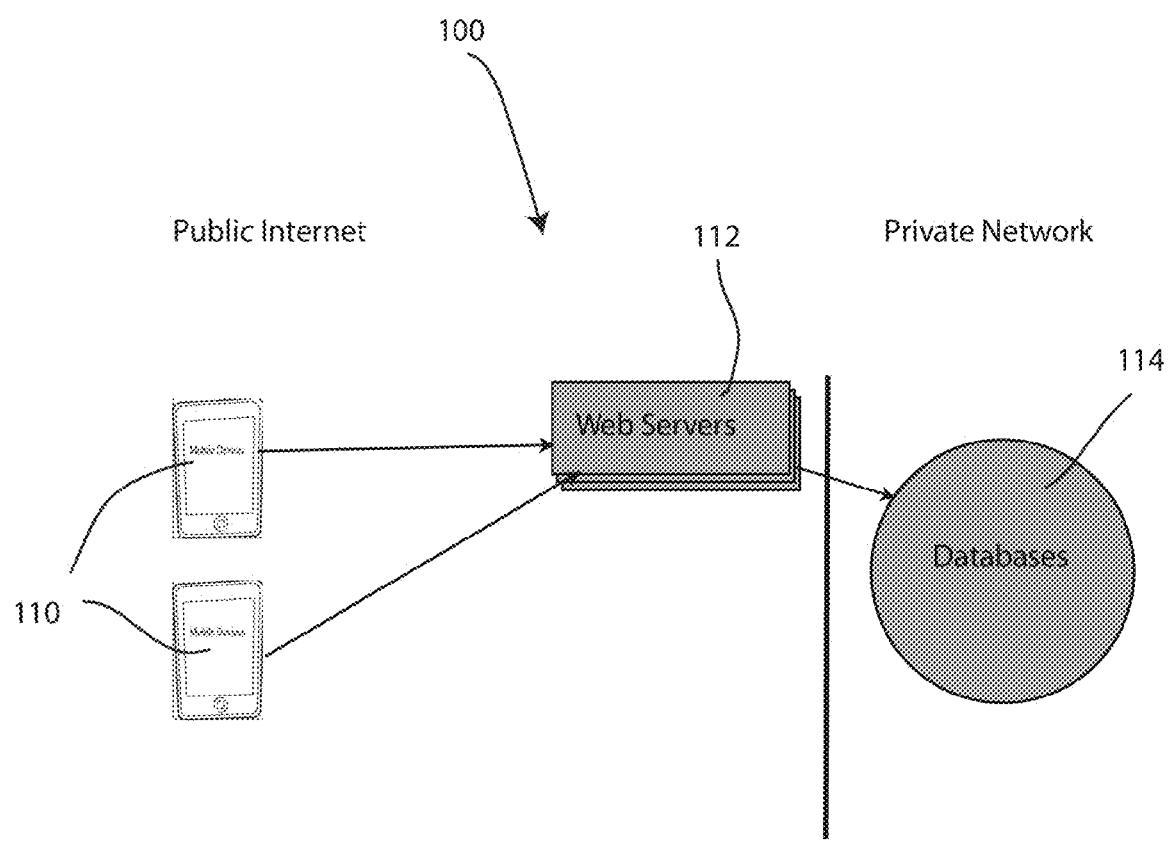
FIG. 1 depicts a schematic view of a system according to one embodiment.

Referring first to FIG. 1, a schematic view of a system 100 is shown. The system 100 includes a user communication device 110, a web server 112, and a database 114. The system 100 may provide for a user (not shown) using the user communications device 110 to input data pertaining to the status of a pool to the web server 112. The web server 112 hosts an interface (shown in FIGS. 2-22) that provides for this manual entry of pool reading data. The interface provides for a user to input levels of pH, chlorine, alkalinity, and temperature, for example using the user communication device 110. The user communication device 110 is configured to transmit this data to the web server 112. The web server 112 is configured to store the data in the database 114. The web server 112 further provides an interface such that this data is retrievable by the user using the user communication device 110. The stored data is thereby viewable on the user communication device 110, or sent in email form to the user's email address. Various other features of the web server and interface will be described hereinbelow.

The user communication device 110 may be a mobile communicator or computer such as a mobile phone, smart phone, personal digital assistant (PDA), laptop computer, desktop computer, tablet computer, or the like. In other words, the user communication device 110 may be any type of communication device that has a display 116 and a user interface 118 that allows a user to input information. The web server 112 may host an interface, shown hereinbelow in FIGS. 2-22, that operates on a system that is employed by the user communication device 110, such as iOS, Android, Windows, MAC OS, linux, or the like. The user communication device 110 may further include at least a transmitter and a receiver for sending and receiving data signals. The user communication device 110 may also be any device with a browser or native application support. The user communication device 110 may be referred simply as a computer apparatus having a processor, as described hereinafter with respect to FIG. 19.

The user communication device 110 may be in communication with the web server 112 so that a user may upload data to the web server 112 regarding the status of a pool, hot-tub, spa, water park, or other swimming facility. The data in the system may be stored in the database 114, which may be hosted by the web server 112. The database 114 may be a MySQL™ database, for example. Direct access to the database 114 may be restricted to the web server 112, database and system administrators. The database 114 may be backed up on a regular schedule as needed. It should be understood that the web server 112 may actually represent a scalable framework that includes multiple different types of servers as needed. In one embodiment, a plurality of apache servers may be installed on a linux system hosted by a web hosting service. The web server 112 may be available to users with maximized up-time so as to not prevent access to the database 114 and web server 112 when requested by a user or administrator.

The web server 112 may host an interface, shown in FIGS. 2-22, that is accessible by the user communication device 110, and other user communication devices (not shown). The web server 112 may also host an account setup interface, shown in FIG. 2. An account may be set up by a user for a company or individual. The registration process may require the user to create an administer username and password for authentication along with company or individual location and billing information to register for a new account.

User accounts may also be set up by any user who has administrative access to the account. User accounts may require, at a minimum, a username, valid email address and temporary password. Once the user account has been created, the user may be able to log in (shown in FIG. 3) and change their password and other settings (for example, shown in FIG. 7).

Among other things described hereinbelow, users with administrative access may be able to set up new swimming facilities in the system, shown in FIG. 12. A setup screen may contain several fields to enter data about the specifics of the pool which may be used by the system, including the address of the pool. Fields may include, but are not limited to: pool volume, chemical type, open and close time, and whether the pool is currently operating. The system 100 may utilize GPS coordinates on the user communication device 110 in order to automatically select the pool using a user's current location when the user's current location matches an address of a pool that has been set up in the system. Moreover, pool location may be utilized directly from the program using turn by turn navigation from the user's current location to the pool address on record. This may be provided by integrating with a mapping application on the user's device or by integrating with an online mapping application where available.

Figure 14:
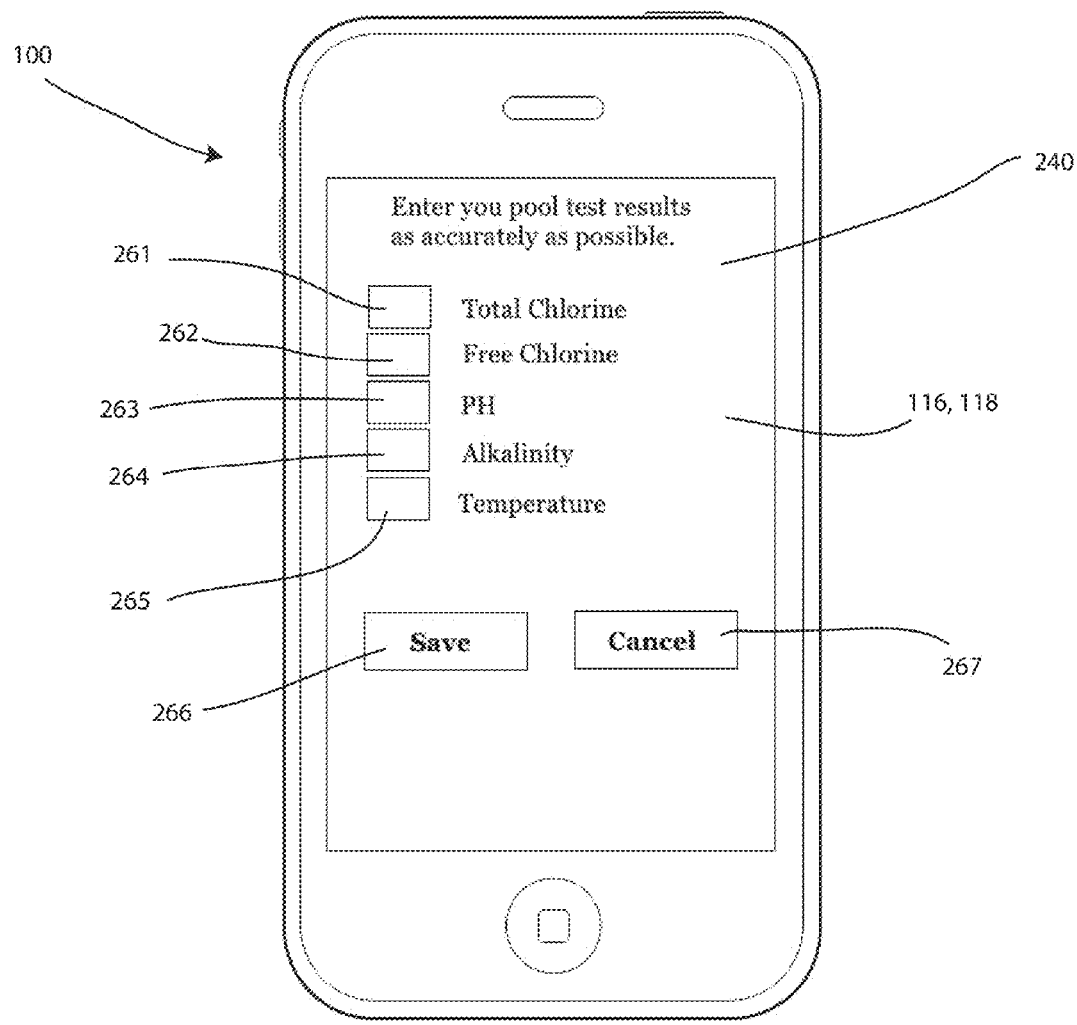
FIG. 14 depicts a pool test recorder interface on the display of the user communication device of the system of FIGS. 1-13 according to one embodiment.

Users may use the system 100 to select a pool and record the chemical test results each time a pool is manually tested, as shown in FIG. 14. It may be up to the users to accurately record the results from each test and manually input the results into the system 100 using the user communication device 110. Recorded tests may be timestamped by the web server 112 interface with the current date, time and user who entered the results. The results data may be stored in the database 114 by the server 112 for a period of time. For example, the data may be stored for at least two years or more depending on state and local regulations.

Figure 15:
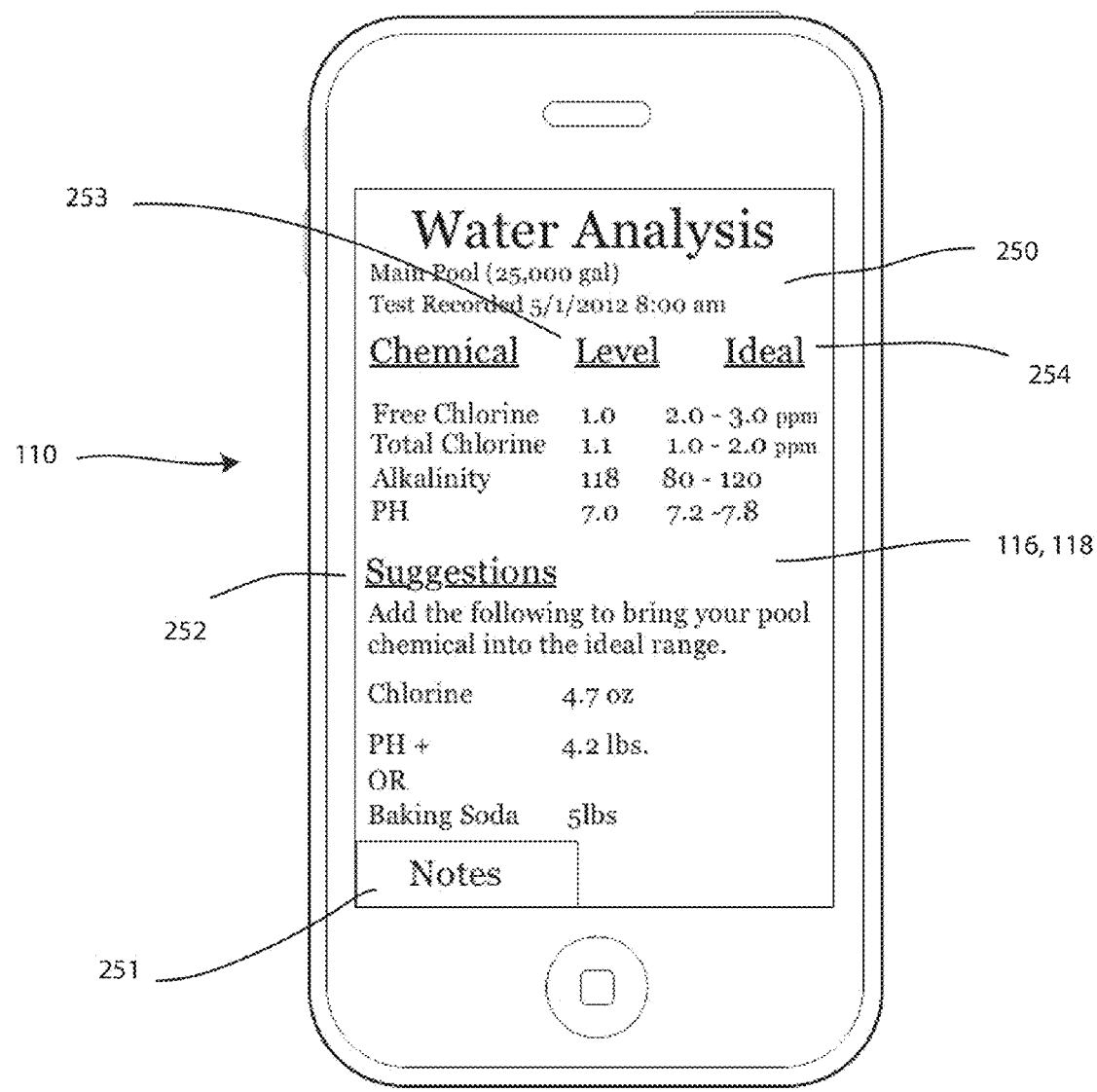
FIG. 15 depicts a water analysis interface on the display of the user communication device of the system of FIGS. 1-14 according to one embodiment.

Once a test has been recorded, the system 100 may use the information provided in the recorded test and pool data to calculate suggested chemical amounts to be manually added to the pool in order to bring the chemical levels into the recommended range which may be provided by the state and government agencies, shown in FIG. 15. These calculations may only be suggestions, as they are dependent on the accuracy of the manual data provided to the system 100 by the user.

In a situation where the user communication device 110 is not connected to the internet, there may be an offline storage option that will save the recorded test data until the user communication device 110 has access to the web server 112 and database 114. The offline storage option may include timestamping the stored data in a similar manner described hereinabove. This data can then be sent to the web server 112 and stored in the database 114 with the proper time stamp (denoting the time that the measurement was taken) when the user communication device 110 regains access to the internet. In one embodiment, the user communication device 110 may automatically send the data to the web server 112 when internet access is restored.

Figure 21:
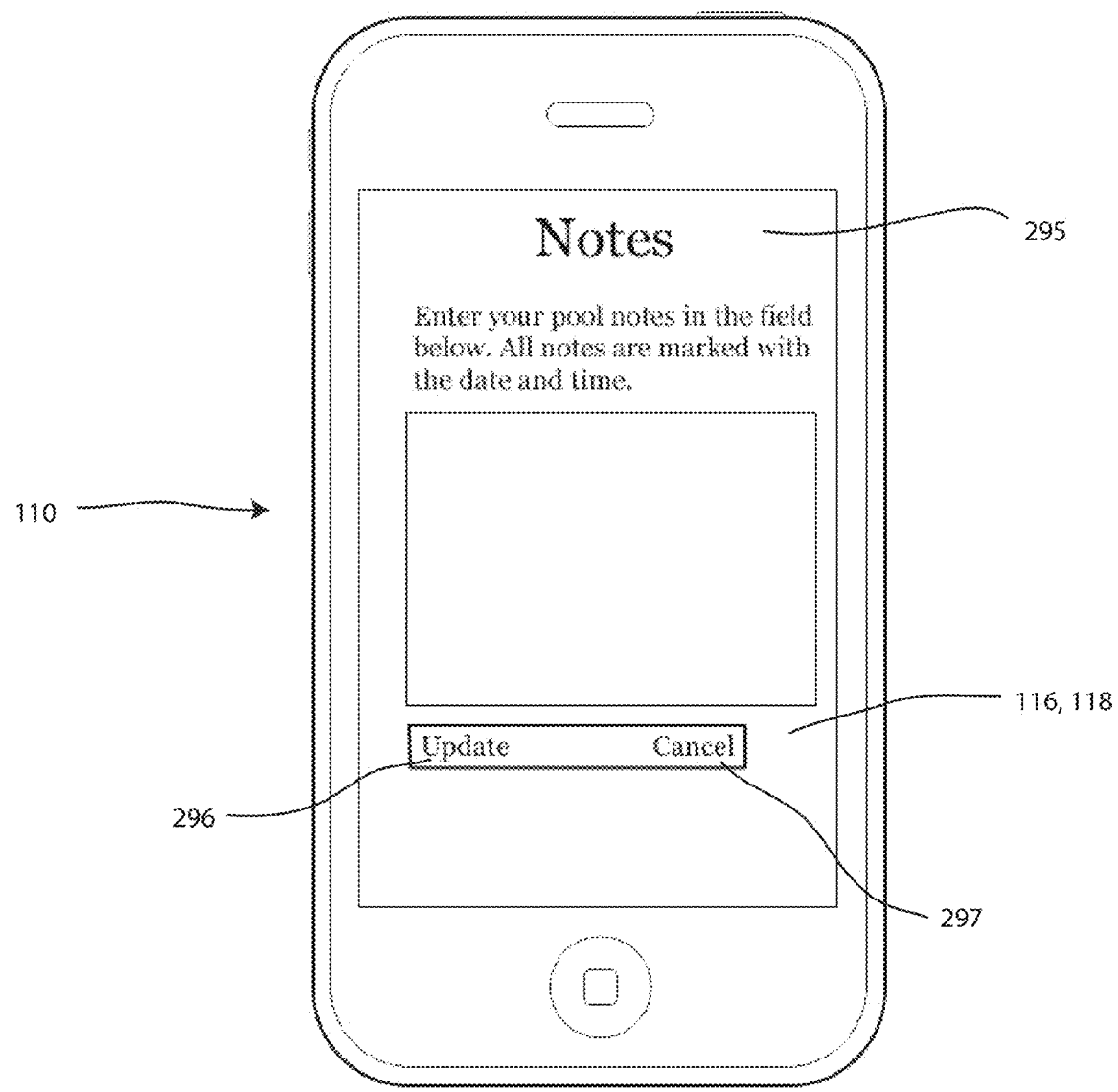
FIG. 21 depicts a notes screen on the display of the user communication device of the system of FIGS. 1-20 according to one embodiment.
Figure 22:
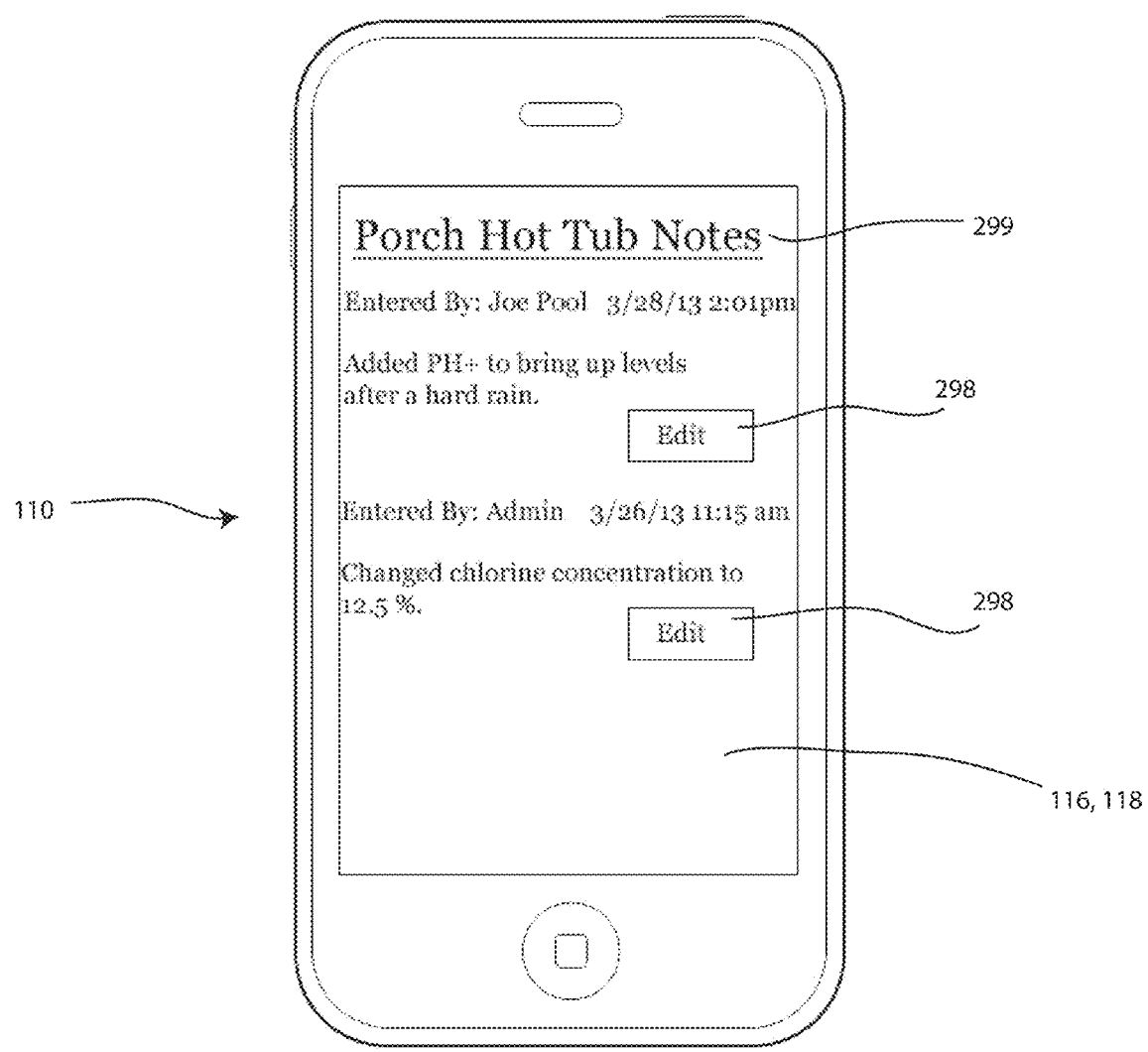
FIG. 22 depicts a pool notes screen on the display of the user communication device of the system of FIGS. 1-21 according to one embodiment.

Optionally, the system 100 may provide the ability to record notes and associate them with a recorded chemical test, shown in FIGS. 21-22. These notes may be available to all users logged into the system 100. The notes may be saved with a date and time stamped with a chemical test id and a user id which corresponds to the user entering the note.

Figure 17:
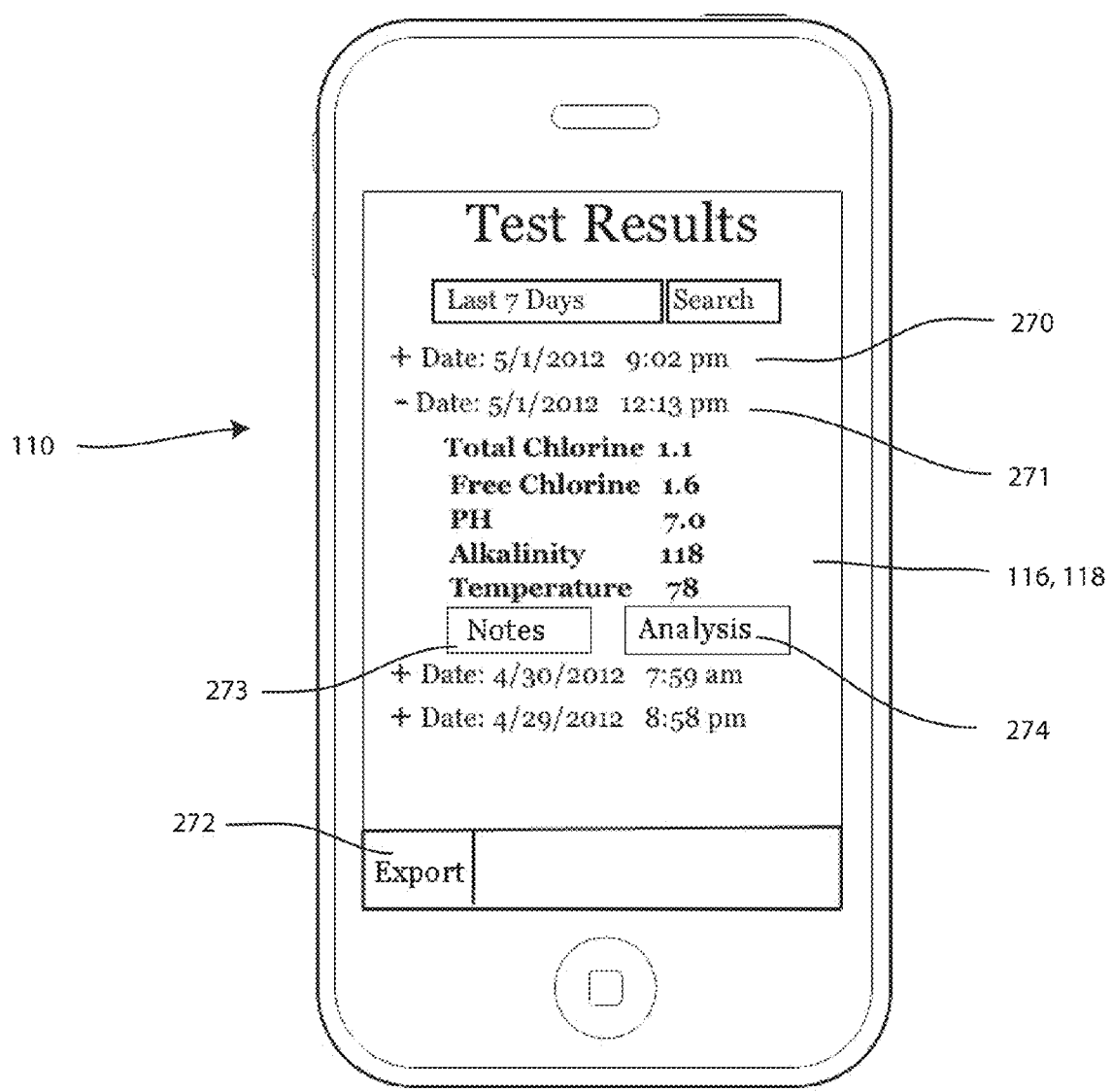
FIG. 17 depicts an expanded test results interface on the display of the user communication device of the system of FIGS. 1-16 according to one embodiment.

Recorded test data may be available for viewing, shown for example in FIG. 17, by the user on the user communication device, or another device, when an authenticated user is logged into the system 100. The web server 112 may provide an option to email the recorded test data for each pool on a periodic basis to administrators and other users. There may be options to retrieve the data in common formats for use in spreadsheets or sending to the government or other agencies upon request.

Figure 2:
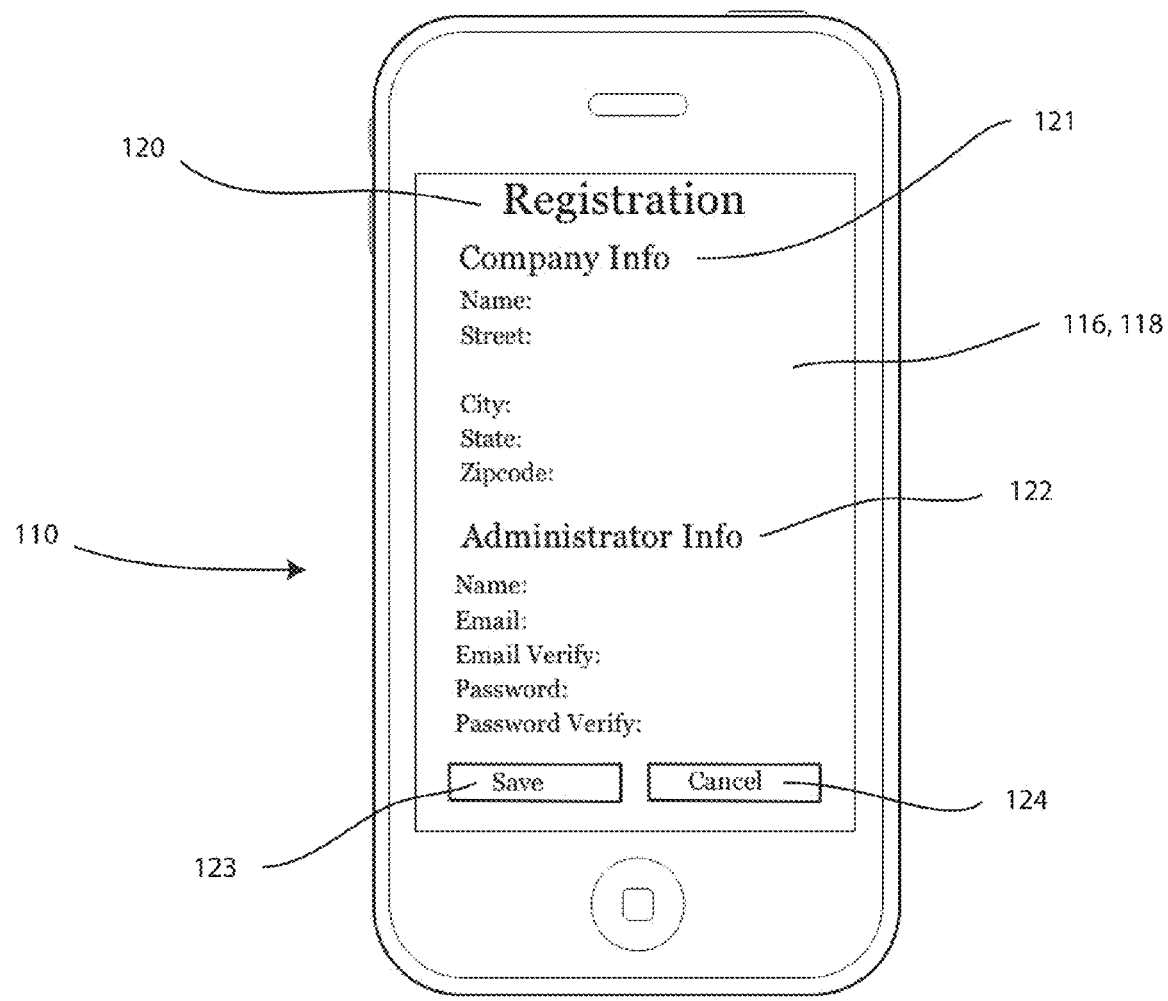
FIG. 2 depicts a registration interface on a display of a user communication device of the system of FIG. 1 according to one embodiment.

Referring now specifically to FIG. 2, a registration interface 120 is shown on a display 116 of the user communication device 110 of the system 100 of FIG. 1 according to one embodiment. The user communication device 110 is shown to be a mobile communicator such as an iPhone® with a touch screen user interface. It should be understood that the web server 112 may host the various features of the user interface described herein. It should also be understood that the interfaces described herein may be a downloadable program loaded onto the user communication device 110. The interface is described hereinbelow with respect to what is displayed and interactable on the user communication device 110.

Referring still to FIG. 2, the registration interface 120 may be used to create an account in the system 100. The registration interface 120 requires the user to enter company information 121 including a company name and address information in this embodiment. However, it should be understood that other embodiments are contemplated that require more or less information to be entered by the user. The registration interface 120 further requires creating a user account that will become the administrator of that account by entering administrator info 122. The user information required by the interface 120 is shown to be a name, email and password. However, again, more or less information may be required. Both the email and password fields may be required to be entered twice to ensure that the user inputs the correct information. Registration information may either be saved 123 or canceled 124 upon being fully or partially entered by a user or administrator.

Figure 3:
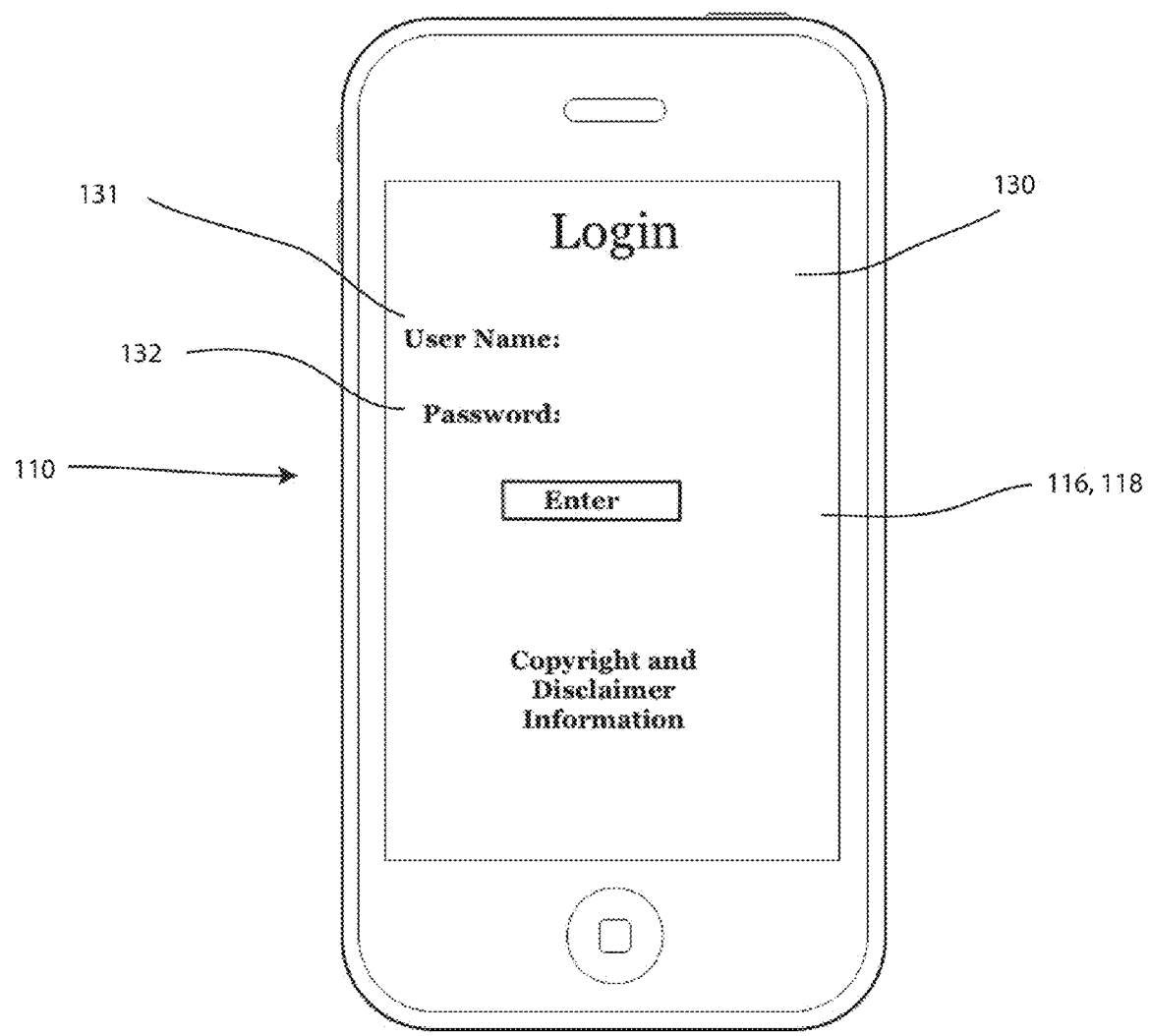
FIG. 3 depicts a login interface on the display of the user communication device of the system of FIGS. 1-2 according to one embodiment.

Referring now to FIG. 3, a login interface 130 is shown on the display 116 of the user communication device 110 of the system 100 of FIGS. 1-2 according to one embodiment. The login interface 130 may allow a registered user or administrator to enter the email address 131 and password 132 used to create their account in order to gain access to the system 100. If the email address and/or password do not match the information used to create the account, they may not be allowed access to the system. It should be understood that the login interface 130 may be bypassed if a user has already entered this information in the registration interface 120 of FIG. 2.

Figure 4:
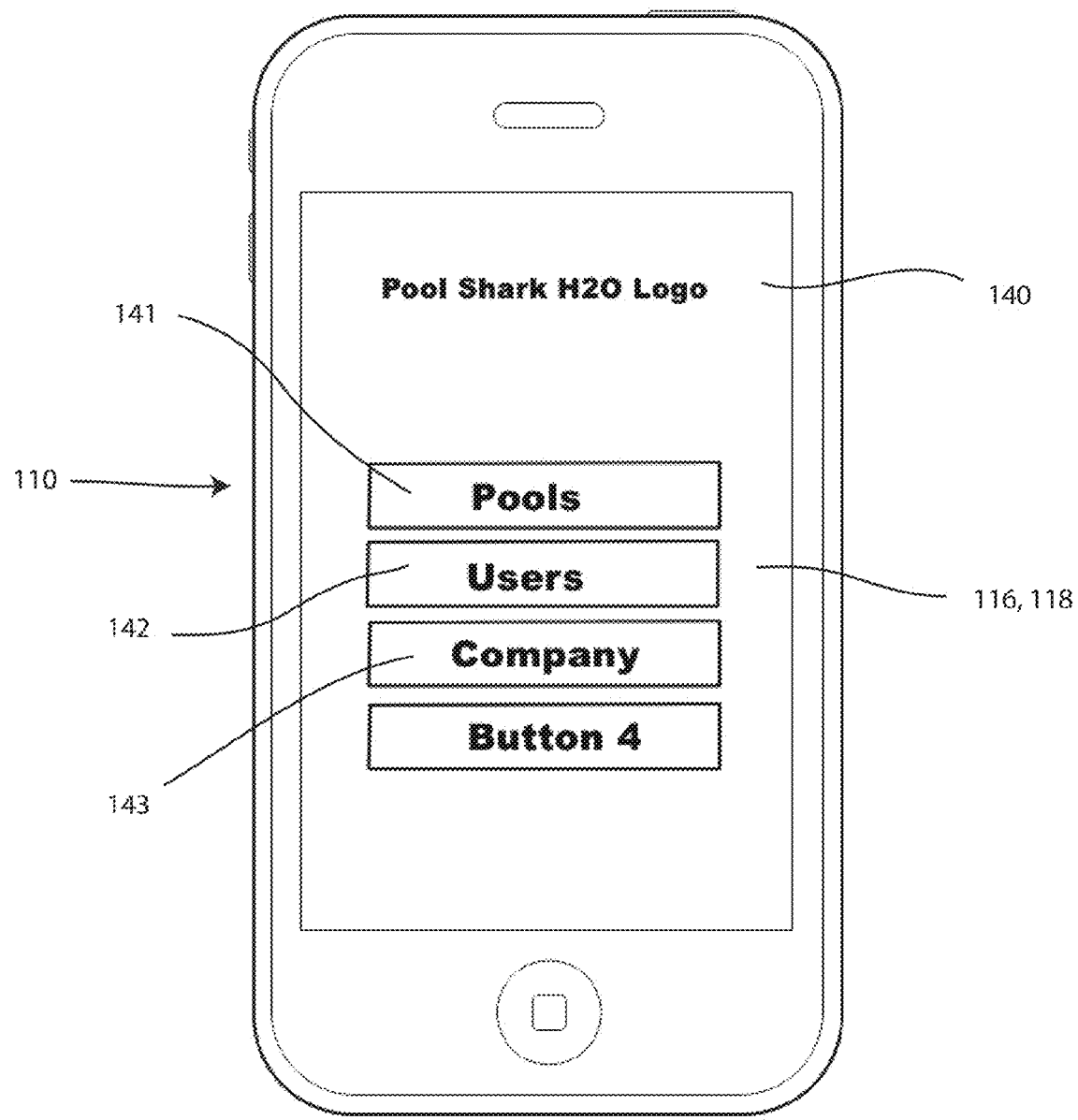
FIG. 4 depicts a home navigation interface on the display of the user communication device of the system of FIGS. 1-3 according to one embodiment.

Referring now to FIG. 4, a home navigation interface 140 is shown on the display 116 of the user communication device 110 of the system 100 of FIGS. 1-3 according to one embodiment. The home navigation interface 140 may be the main access point to the top level features of the system 100. From this interface 140, the user may be able to access a Pools interface (shown, for example, in FIG. 11), a Users interface (shown, for example, in FIG. 5), and a Company interface (shown for example, in FIG. 9), via a Pools button 141, a Users button 142, and a Company button 143 depending on their role. Administrators may have access to all features while normal users may be able to access a limited number of features from the home navigation interface 140.

Figure 5:
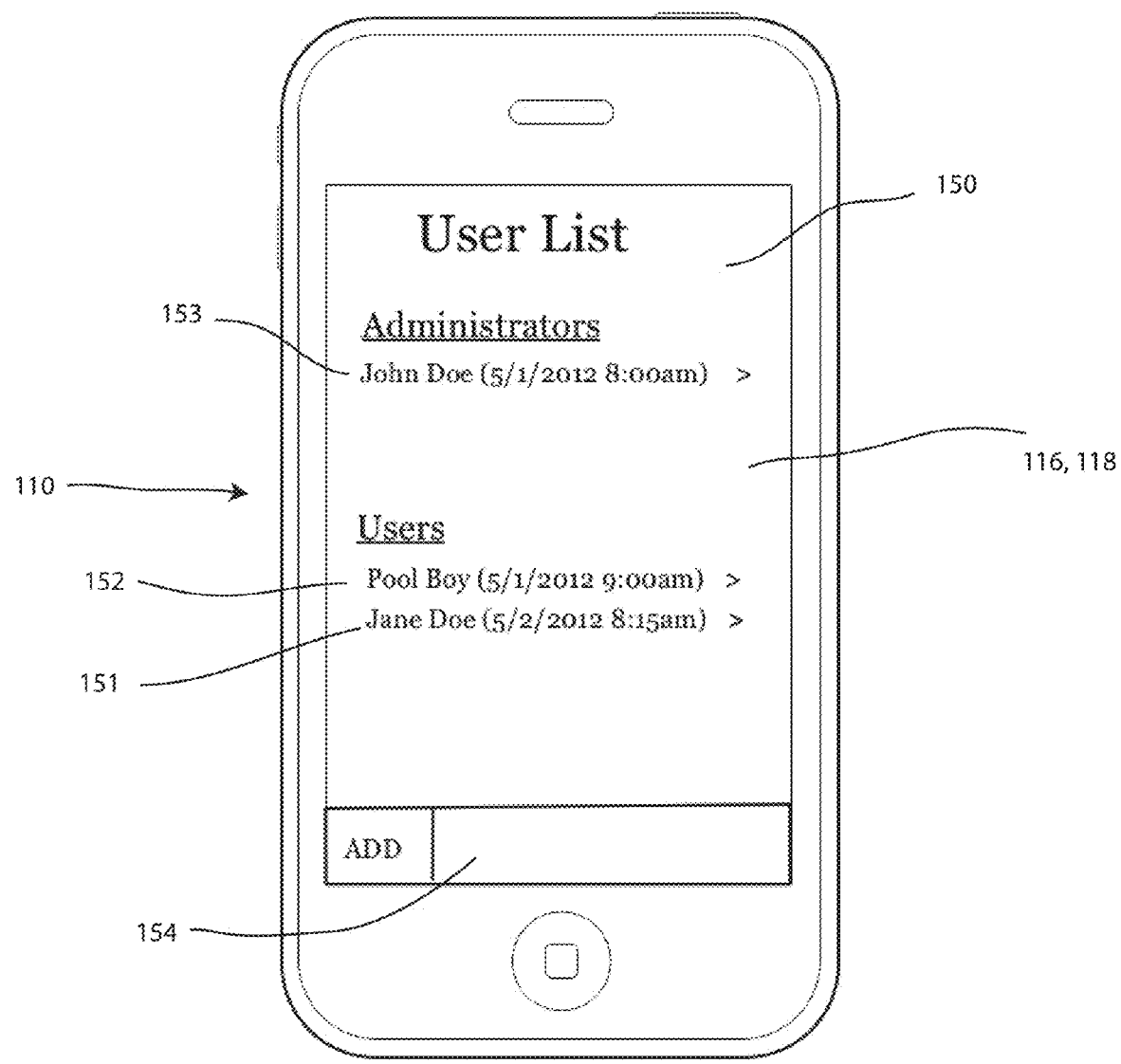
FIG. 5 depicts a user list interface on the display of the user communication device of the system of FIGS. 1-4 according to one embodiment.

FIG. 5 depicts a user list interface 150 on the display 116 of the user communication device 110 of the system 100 of FIGS. 1-4 according to one embodiment. The user list interface 150 may, for example, be available by clicking on the Users button 142 of the home navigation interface 140, and may be available only to those users who have an administrator role. This interface 150 may show all of the user accounts that have been created for this company and the date and time of the last login by each user. Clicking on a name 151, 152, 153 of a user or administrator may access additional user information, shown in FIG. 6. This interface 150 also may provide a link 154 for the administrator to add additional users, the interface for doing so being shown in FIG. 7.

Figure 6:
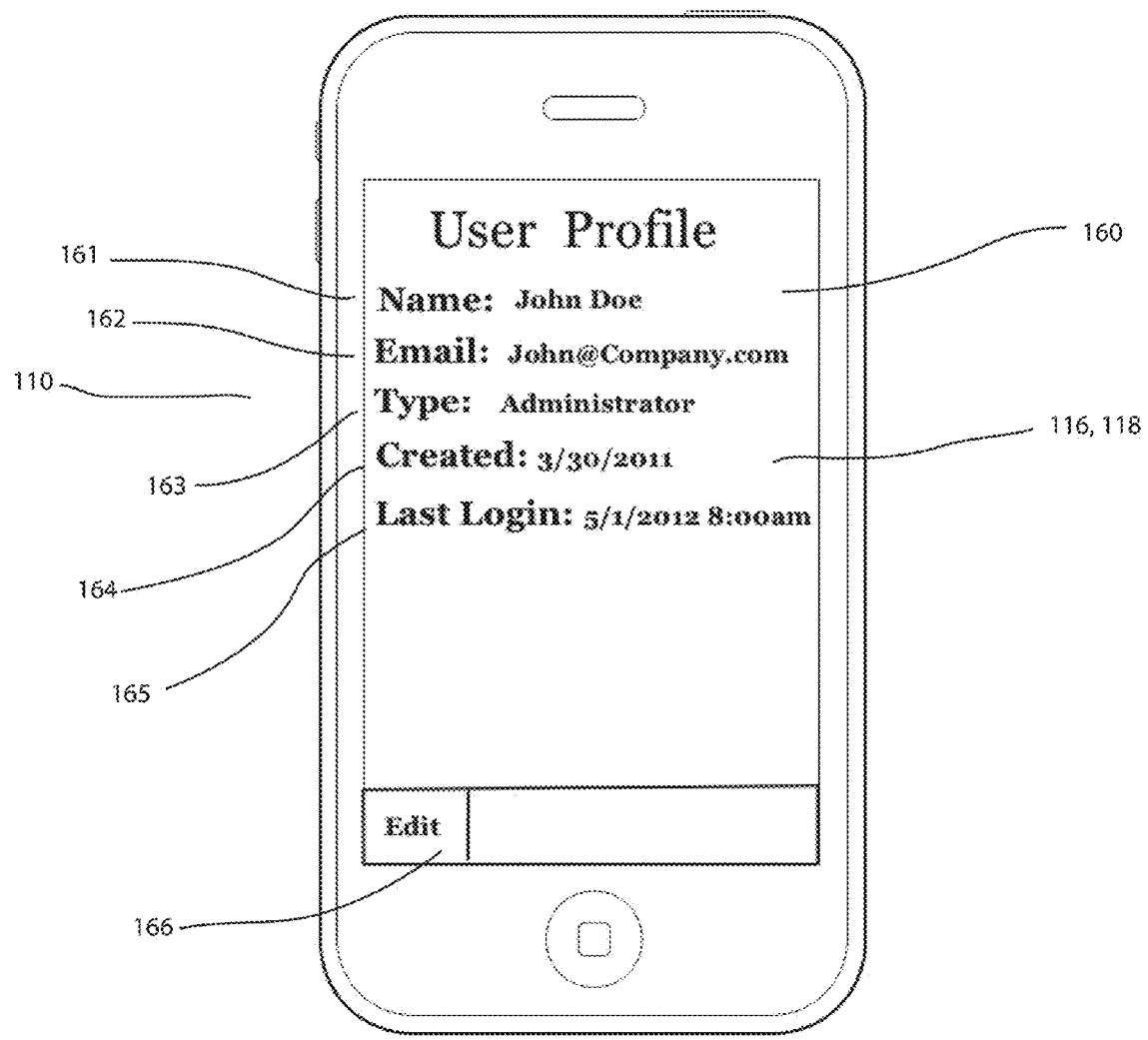
FIG. 6 depicts a user profile interface on the display of the user communication device of the system of FIGS. 1-5 according to one embodiment.

FIG. 6 depicts a user profile interface 160 on the display 116 of the user communication device 110 of the system 100 of FIGS. 1-5 according to one embodiment. The user profile interface 160, for example, may show the user's name 161, email 162, the type of account 163, the date the user account was created 164, and the last time the user logged into the system 165. The profile interface 160 screen may also display whether or not the user has messaging and alerts turned on or off (not shown). A navigation link 166 on this screen may allow a user to enter into a separate "edit user" interface described hereinbelow in FIG. 7.

Figure 7:
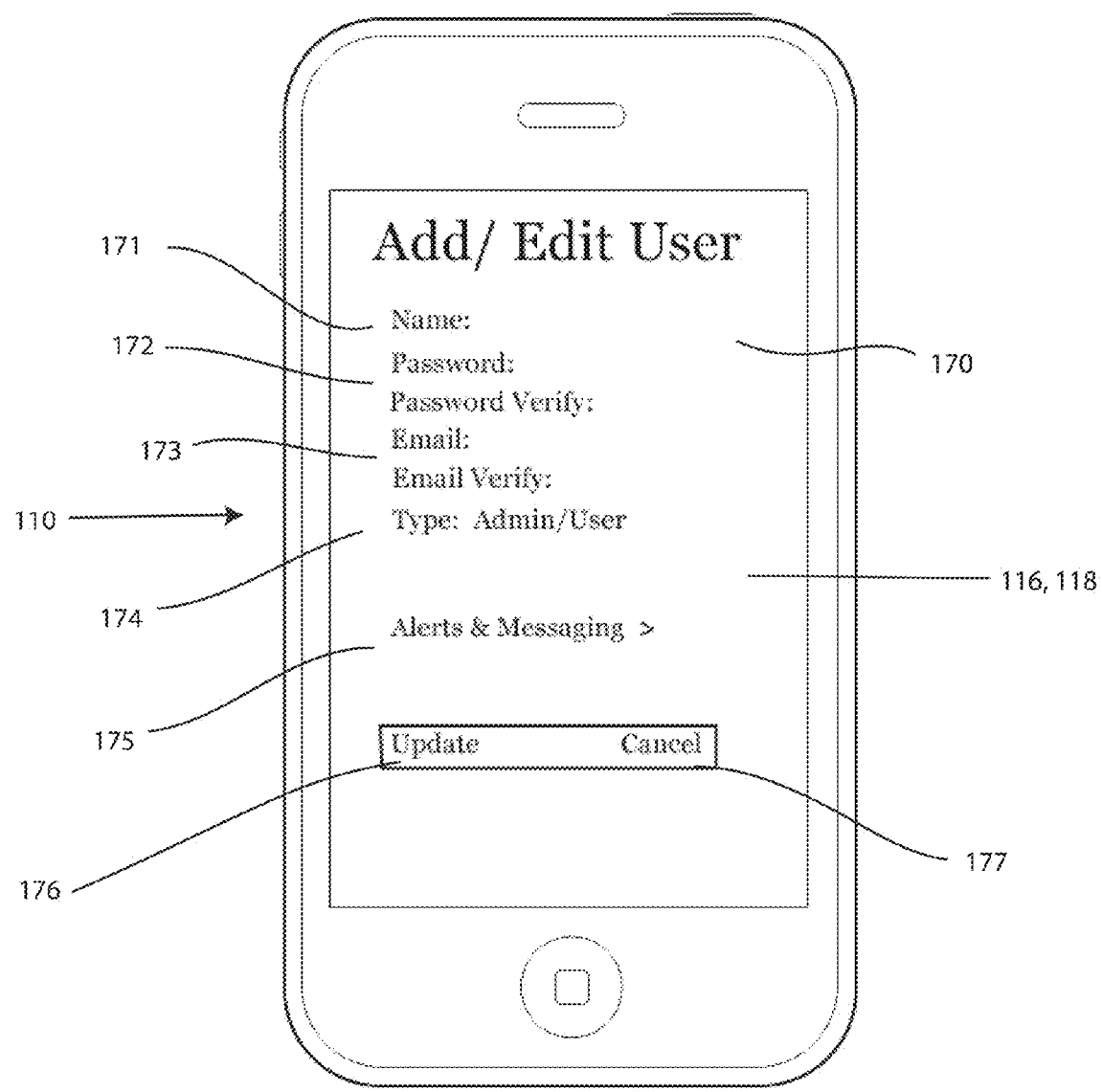
FIG. 7 depicts a add/edit user interface on the display of the user communication device of the system of FIGS. 1-6 according to one embodiment.

FIG. 7 depicts an add or edit user interface 170 on the display 116 of the user communication device 110 of the system 100 of FIGS. 1-6 according to one embodiment. The user edit interface 170 may be available to both administrators and users. Users without administrator privileges may only be able to edit their own profile. This interface 170 may require the user to enter a name 171, password 172, email 173, and user type 174. These prompts are meant to be exemplary, as the user may be required to enter other information as well. These entries may be transmitted by the user communications device 110 to the web server 112 and stored by the web server 112 in the database 114. Alerts and messaging options for individual users may be accessible from this screen via an Alerts & Messaging button 175. Once a user has entered information, the user may press or otherwise activate an update button 176 to update the information, or a cancel button 177 to cancel the information.

Figure 8:
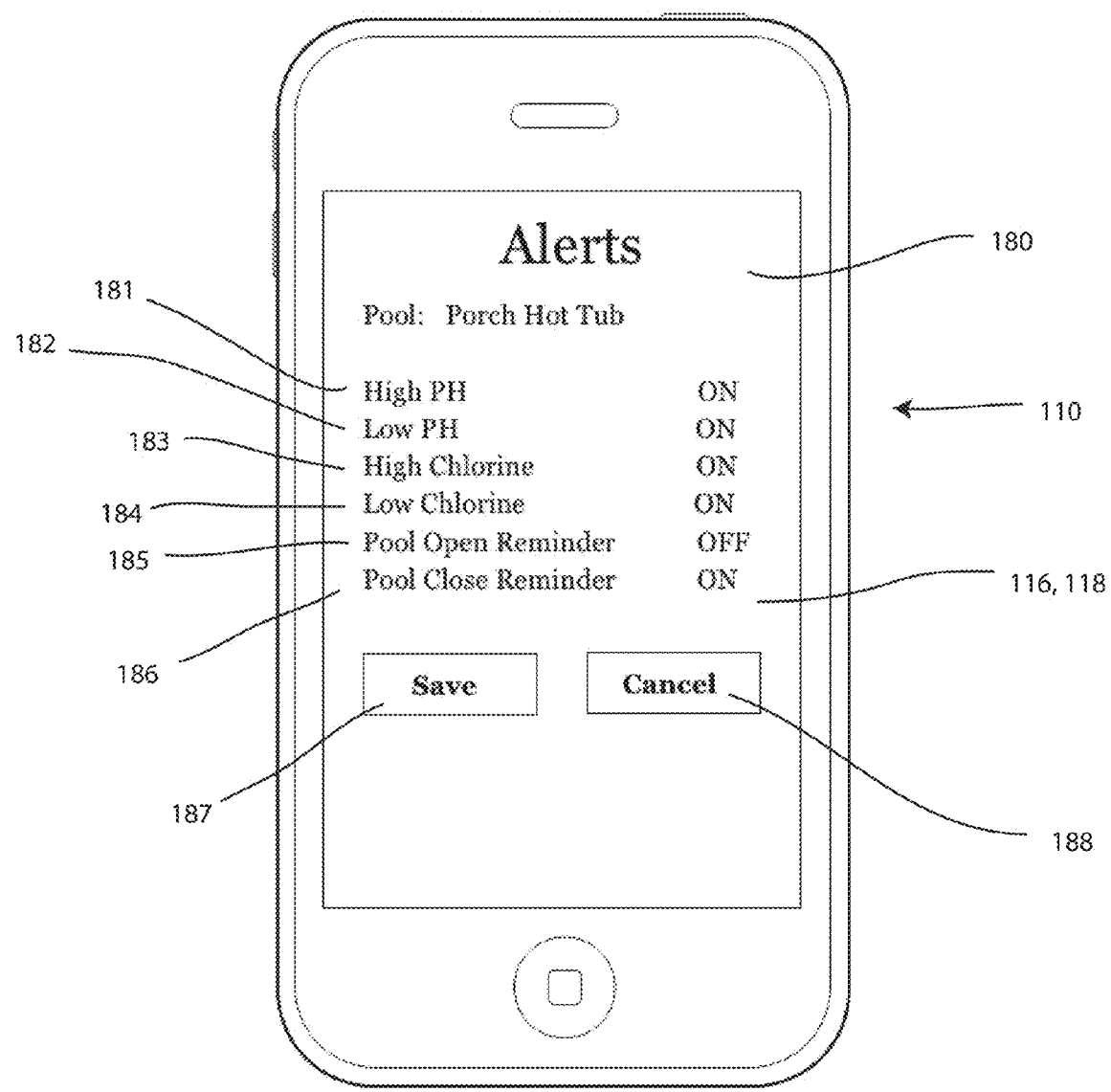
FIG. 8 depicts a reminder and alert interface on the display of the user communication device of the system of FIGS. 1-7 according to one embodiment.

Shown in FIG. 8 is a reminder and alert interface 180 on the display 116 of the user communication device 110 of the system 100 of FIGS. 1-7 according to one embodiment. The alert interface 180 may allow a user to set up and receive warnings and reminders when certain criteria have been met. For example, a user may be alerted when the pool has a high PH 181, a low PH 182, high chlorine content 183, low chlorine content 184, when a pool opens 185 or when a pool closes 186. The user may have the ability to turn on or off these alerts as desired by selecting an on/off toggle next to each option. The alert settings may be transmitted to the web server 112 by the user communications device 110. The web server 112 may store a user's alert settings in the database 114 and update those settings when appropriate. Changes to the alert interface 180 may be saved 187 or canceled 188.

Figure 9:
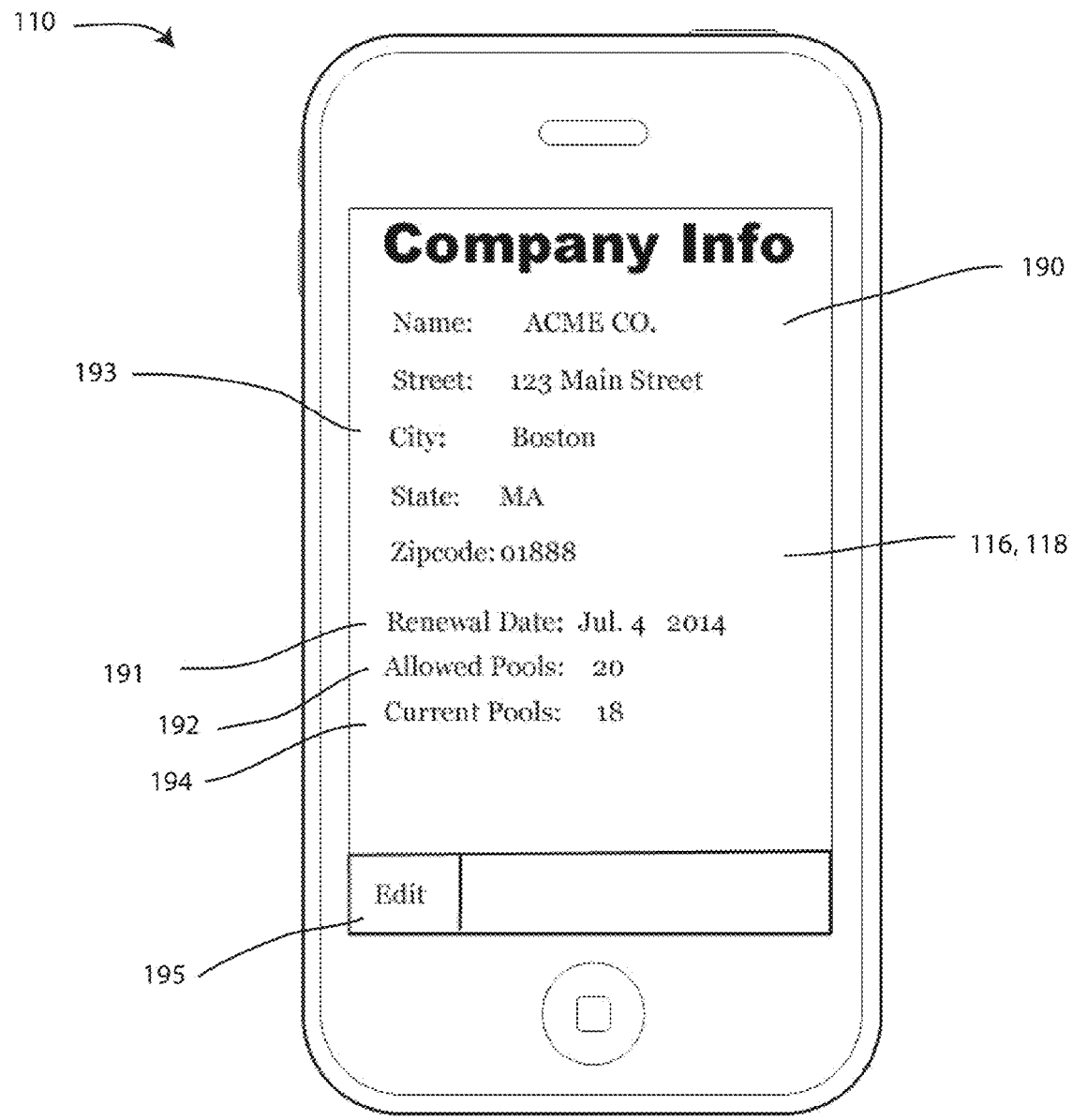
FIG. 9 depicts a company profile interface on the display of the user communication device of the system of FIGS. 1-8 according to one embodiment.

FIG. 9 depicts a company profile interface 190 on the display 116 of the user communication device 110 of the system 100 of FIGS. 1-8 according to one embodiment. The company profile interface 190 may display the information about the company, including address information 193 that was set up during the initial registration screen shown in FIG. 2 hereinabove. This information may only be seen or updated by a user with administrator privileges in one embodiment. The billing renewal date 191, the current number of pools 194 and the number of allowed pools 192 may also be displayed on this screen as an indicator as to whether the account is active or requires payment. This screen may have a link 195 to access the company edit screen for updating. Like previous information, the profile information may be sent to the web server 112 by the user communications device 110. The web server 112 may store profile information in the database 114 and update those settings when appropriate.

Figure 10:
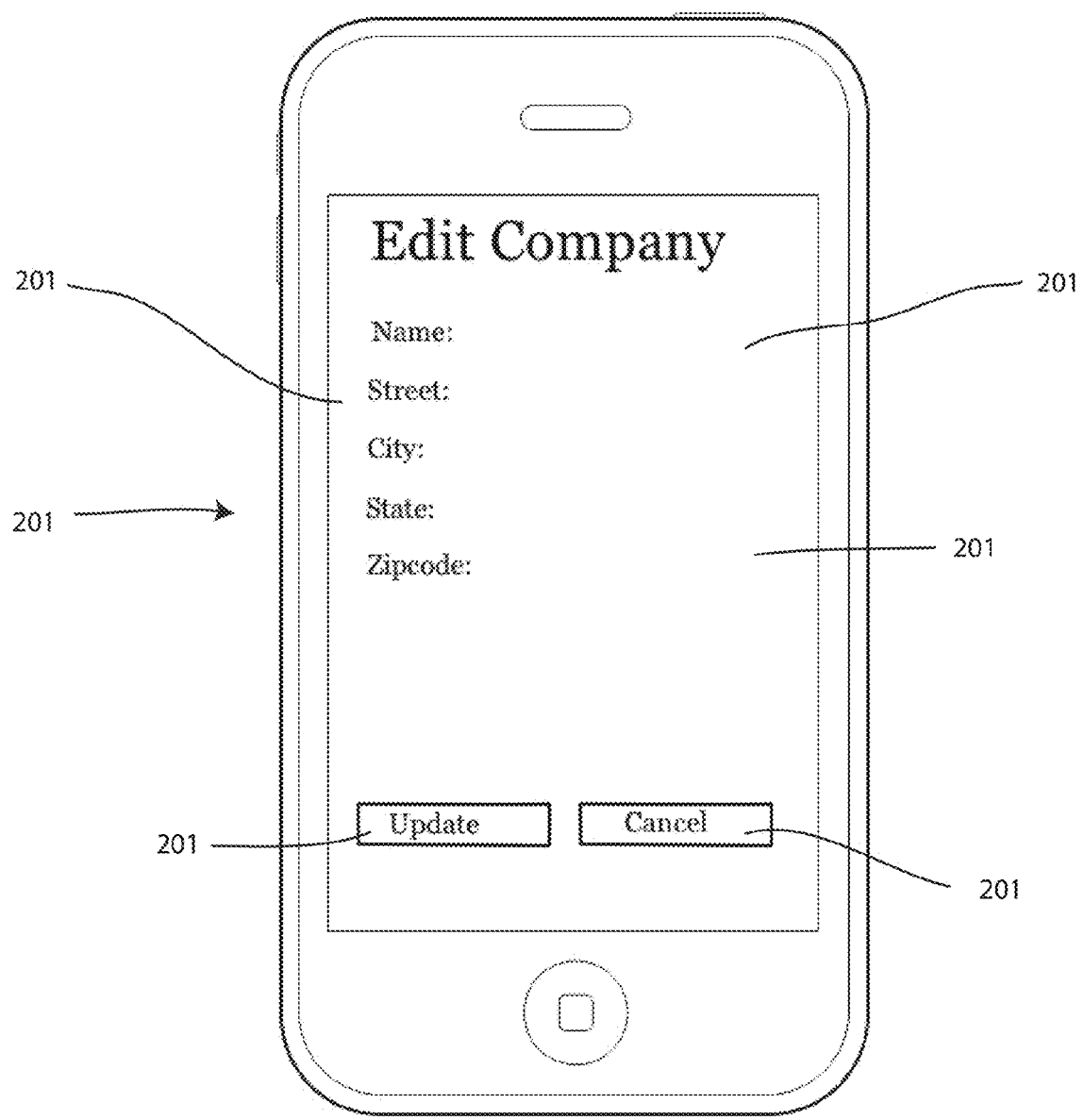
FIG. 10 depicts an edit company interface on the display of the user communication device of the system of FIGS. 1-9 according to one embodiment.

FIG. 10 shows an edit company interface 200 on the display 116 of the user communication device 110 of the system 100 of FIGS. 1-9 according to one embodiment. The company edit interface 200 may provide an administrator the ability to change company information 201 including the name, address, and billing address. Only administrators may have access to this screen in one embodiment. Furthermore, the administrators may only be able to access company screens for the company to which they belong. Again, the company information may be sent to the web server 112 by the user communications device 110. The web server 112 may store company information in the database 114 and update those settings when appropriate. Like previous interfaces, the company interface 200 may include an update button 202 and a cancel button 203 for updating the information to the system 100.

Figure 11:
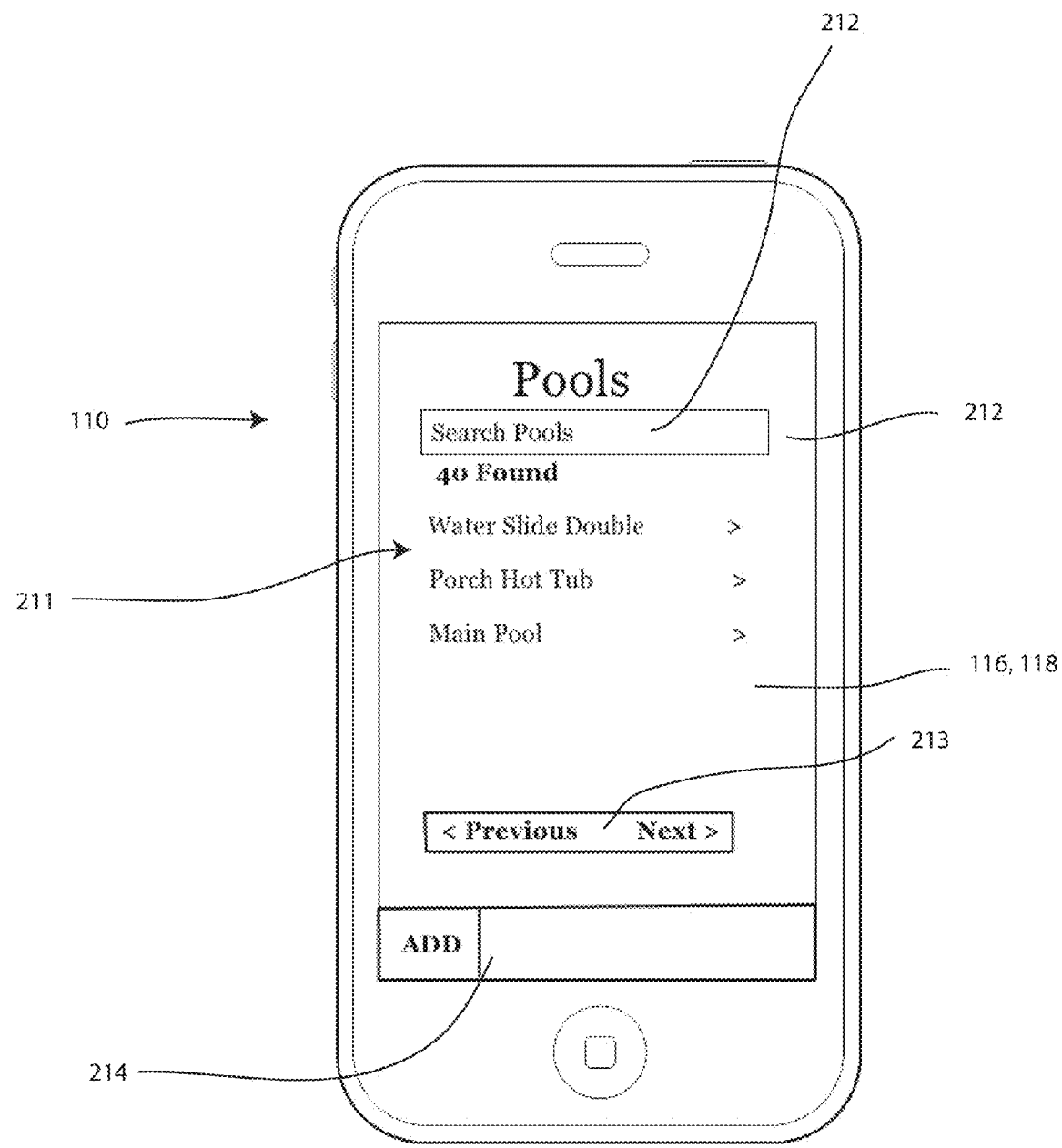
FIG. 11 depicts a pool list interface on the display of the user communication device of the system of FIGS. 1-10 according to one embodiment.

FIG. 11 depicts a pool list interface 210 on the display 116 of the user communication device of the system of FIGS. 1-10 according to one embodiment. The pool list interface 210 may show, on the display 116, all the pools 211 created for the company the user is associated with. From this screen the user may select a pool which may go to a pool management interface or the user may go directly to the test recording screen and enter the pool chemical results from their manual test. A search field 212 may be provided which may allow a user to find a pool by entering part of the name or by alternately entering the pool's service ID. Clicking or tapping the Next/Previous buttons 213 may allow the user to view more pools a page at a time. Administrators may also have the ability to add another pool in the pool list interface 210 with an add interface 214.

Figure 12:
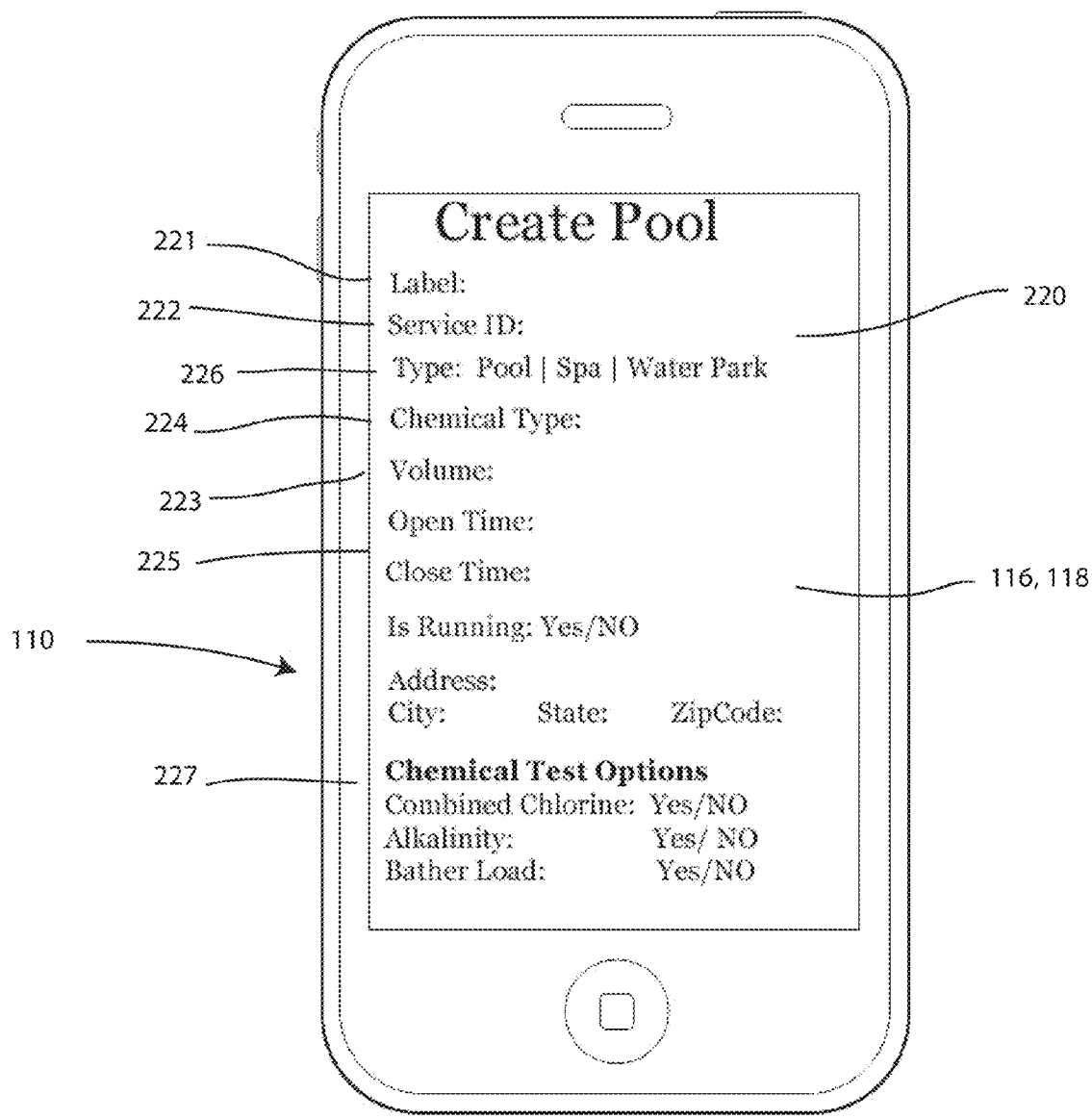
FIG. 12 depicts an add/edit pool interface on the display of the user communication device of the system of FIGS. 1-11 according to one embodiment.

FIG. 12 depicts an add/edit pool interface 220 on the display 116 of the user communication device 110 of the system 100 of FIGS. 1-11 according to one embodiment. The add/edit pool interface 220 may allow the administrator the ability to set up a pool by entering a label 221, an optional service ID 222, a pool water volume 223, the type of chemical used 224, open and close time 225, and the type of pool 226. It should be understood that these are only examples of the information that may be enterable by a user through the add/edit pool interface 220. The information added in this interface 220 may be used to determine the appropriate chemical dosages to add to the pool in order to keep the pool in chemical balance as mandated by a governing authority. The pool type of pool, spa, or water park, may determine the requirements for the pool as determined a governing authority. The information regarding each setup pool may be sent to the web server 112 by the user communications device 110. The web server 112 may store information regarding each setup pool in the database 114 and update those settings when appropriate. Chemical testing options 227 may allow users to turn on or off chemical tests which may not be required by the state or other governing bodies. Chemical tests which are turned off will not appear on the test recording screens or in the exported data.

Figure 13:
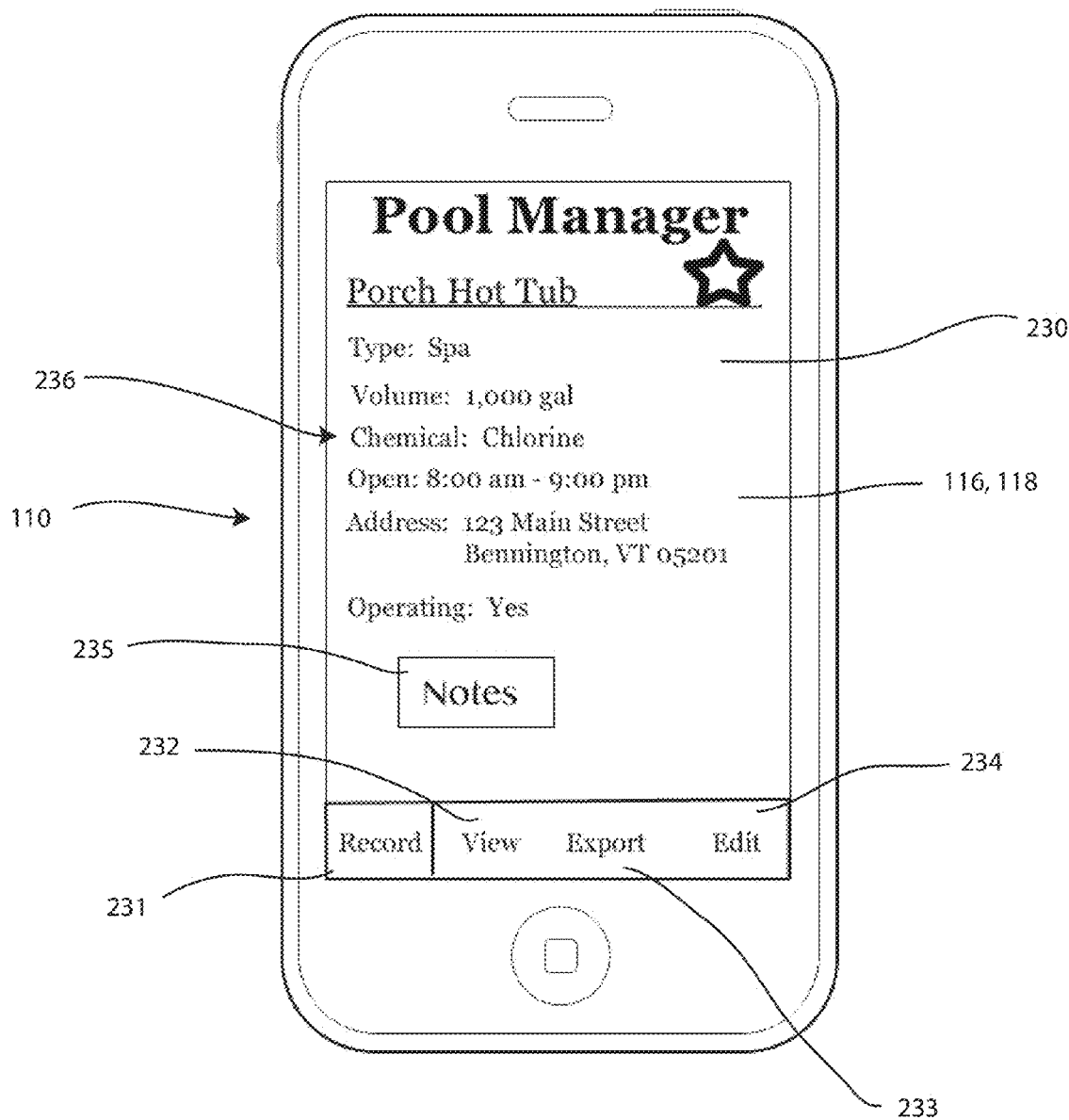
FIG. 13 depicts a pool manager interface on the display of the user communication device of the system of FIGS. 1-12 according to one embodiment.

FIG. 13 depicts a pool manager interface 230 on the display 116 of the user communication device 110 of the system 100 of FIGS. 1-12 according to one embodiment. The pool manager interface 230 displays all of the pool information 236 to the user. This may include navigation button that opens another interface to record a chemical test for the pool 231, another navigation button that opens an interface that views all tests recorded for the pool 232, another navigation button that emails or otherwise exports all the test results to the user 233. If the user is an administrator, they may also be provided with a navigation button that allows the administrator to be given a link to edit the pool information 234. A notes button 235 may provide access to all the notes recorded for this pool. Additionally, a "favorites" button, as indicated by the star, will mark the pool as this user's favorite, and display the pool at the top of the pool's list when the pool is selected as a favorite.

In FIG. 14 is a pool test recorder interface 240 on the display 116 of the user communication device 110 of the system 100 of FIGS. 1-13. The pool test recorder interface 240 may be an example of a core screen in the interface of the system 100. The pool test recorder interface 240 may allow users to manually enter pool related data or test results determined by testing the water in the pool multiple times a day. These test results may be sent by the user communicator 110 to the web server 100. Some examples of results that may be enterable in the interface 240 are total Chlorine 241, Free Chlorine 242, pH 243, Alkalinity 244, and temperature 245. Other chemical tests results may be included, for example, for pools using Bromine. The test results may be saved by the web server 112 in the database 114 with a date time stamp by the web server 112 and the user id for the user recording the test with a save button 246. Once these results are saved they may be available for review by the web server 112 for at least two years. Incorrectly entered results may be canceled with a cancel button 267.

FIG. 15 depicts a water analysis interface 250 on the display 116 of the user communication device 110 of the system 100 of FIGS. 1-14 according to one embodiment. After the user enters the test results using the interface 240 from FIG. 14, the system 100 or the server 112 may use the information from the test and the information entered about the pool entered using the interface 230 found in FIG. 13 to determine the chemical amounts to be added to the pool if necessary in order to bring the pool chemicals into balance. The water analysis interface 250 may display the current levels 253 and the ideal levels 254 of the chemicals that have been input from the pool test recorder interface 240. The water analysis interface 250 may suggest chemical amounts to add 252 based on the inputted data from the pool test recorder interface 240. The web server 112 may send these chemical amounts to the user communication device 110 when requested by the user communication device 110. A notes button 251 provides a user the ability to enter additional information in a free form format. This optional information will be linked to the chemical test and date time stamped with the user's ID.

Figure 16:
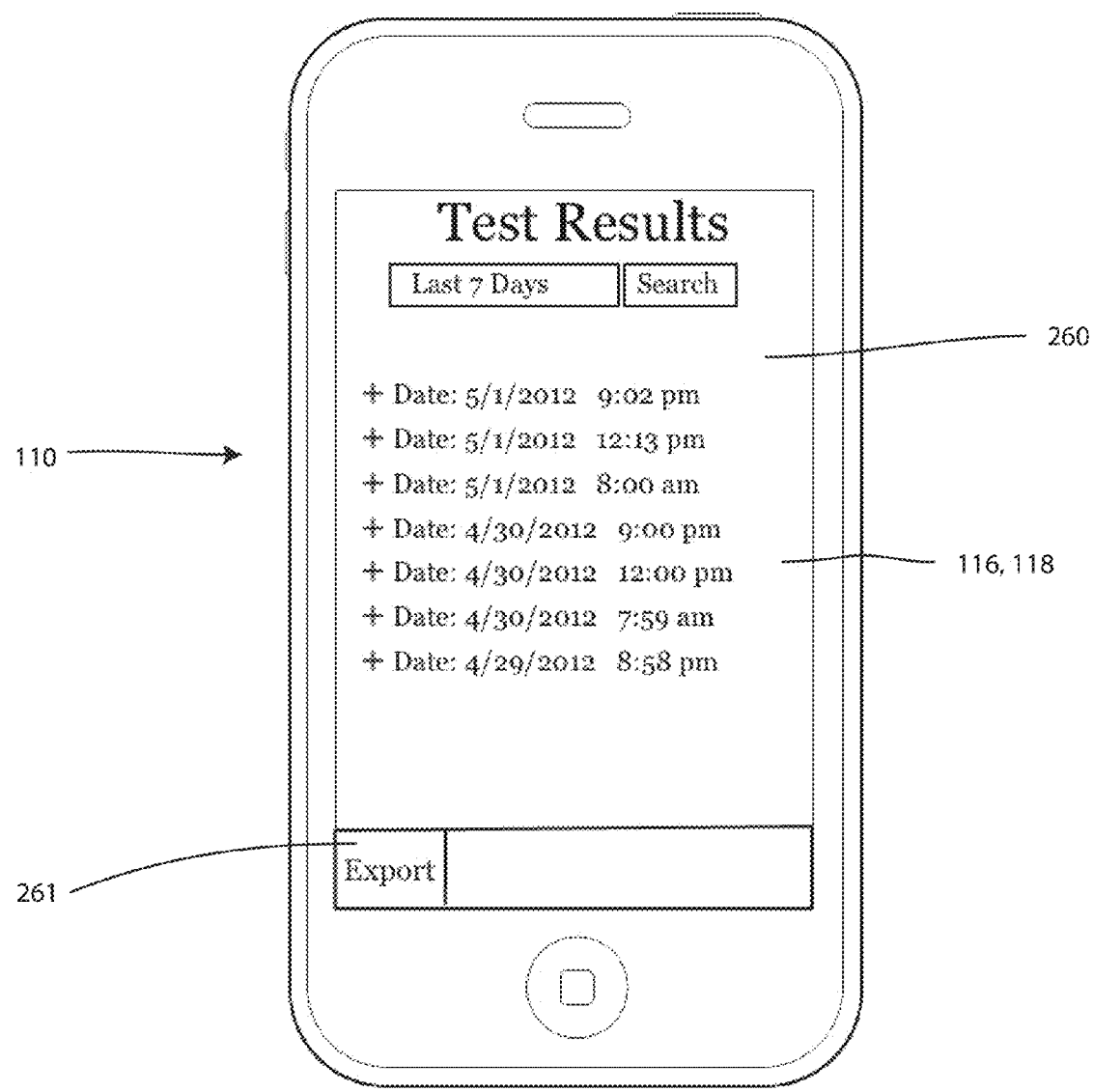
FIG. 16 depicts a test results interface on the display of the user communication device of the system of FIGS. 1-15 according to one embodiment.

FIG. 16 shows a test results interface 260 on the display 116 of the user communication device 110 of the system 100 of FIGS. 1-15 according to one embodiment. The test results interface 260 allows a user to see some or all the tests that have been performed previously on a pool. These results may either be stored in the memory of the user communication device 110, or alternately provided by the web server 112 upon request. A filter may be implemented on the top of the screen that allows users to limit the results returned back to the screen. Selecting the name of the test may expand the selected view displaying all the enter test results, as shown in FIG. 17. The export button 261 on the bottom may send all the test results to the user's email account. Alternately, the export button 261 may take the user to a screen providing options for retrieving the test data in other various ways. Either the web server 112 or the user communication device 110 may send the data.

FIG. 17 depicts an expanded test results interface 270 on the display 116 of the user communication device 110 of the system 100 of FIGS. 1-16 according to one embodiment. The expanded test results interface 270 is similar to the test results interface 260, but may show all the recorded data for the date and time selected. Selecting the particular test 271 again may minimize the view showing the list of test dates again so that the user may select another test if desired. The notes button 273 on this screen will take the user to an editable screen displaying the note that was entered when the test was recorded. The Analysis button 274 is only available on the most recent recorded chemical test. It may display the suggested chemical amounts to bring the pool's chemicals into the ideal range. An export button 272 on the bottom may send all the test results to the user's email account. Alternately, the export button 272 may take the user to a screen providing options for retrieving the test data in other various ways. Either the web server 112 or the user communication device 110 may send the data.

Figure 18:
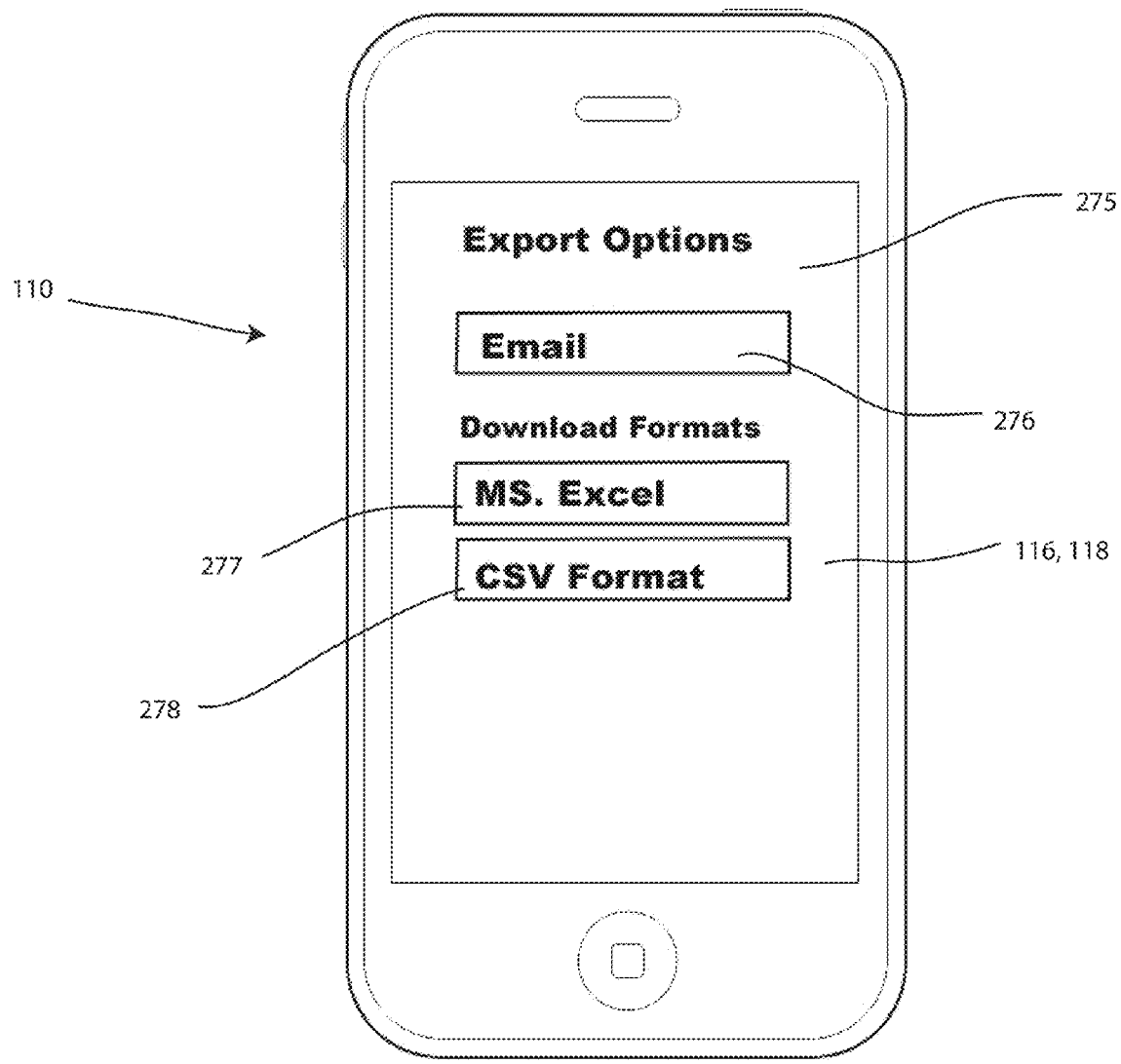
FIG. 18 depicts an export screen on the display of the user communication device of the system of FIGS. 1-17 according to one embodiment.

FIG. 18 shows one example of an export options interface 275 on the display 118 of the user communication device 110 of the system 100 of FIGS. 1-17. The export options interface 275 may provide the user options for retrieving the chemical logging data from the system 100. The user may elect to receive an email with the testing information by pressing an email button 276 or download a file with all the available testing information in a common format by pressing one of the format buttons 277, 278. For example, formats may include Microsoft Excel or CSV (comma separated list). Other formats are contemplated.

Figure 19:
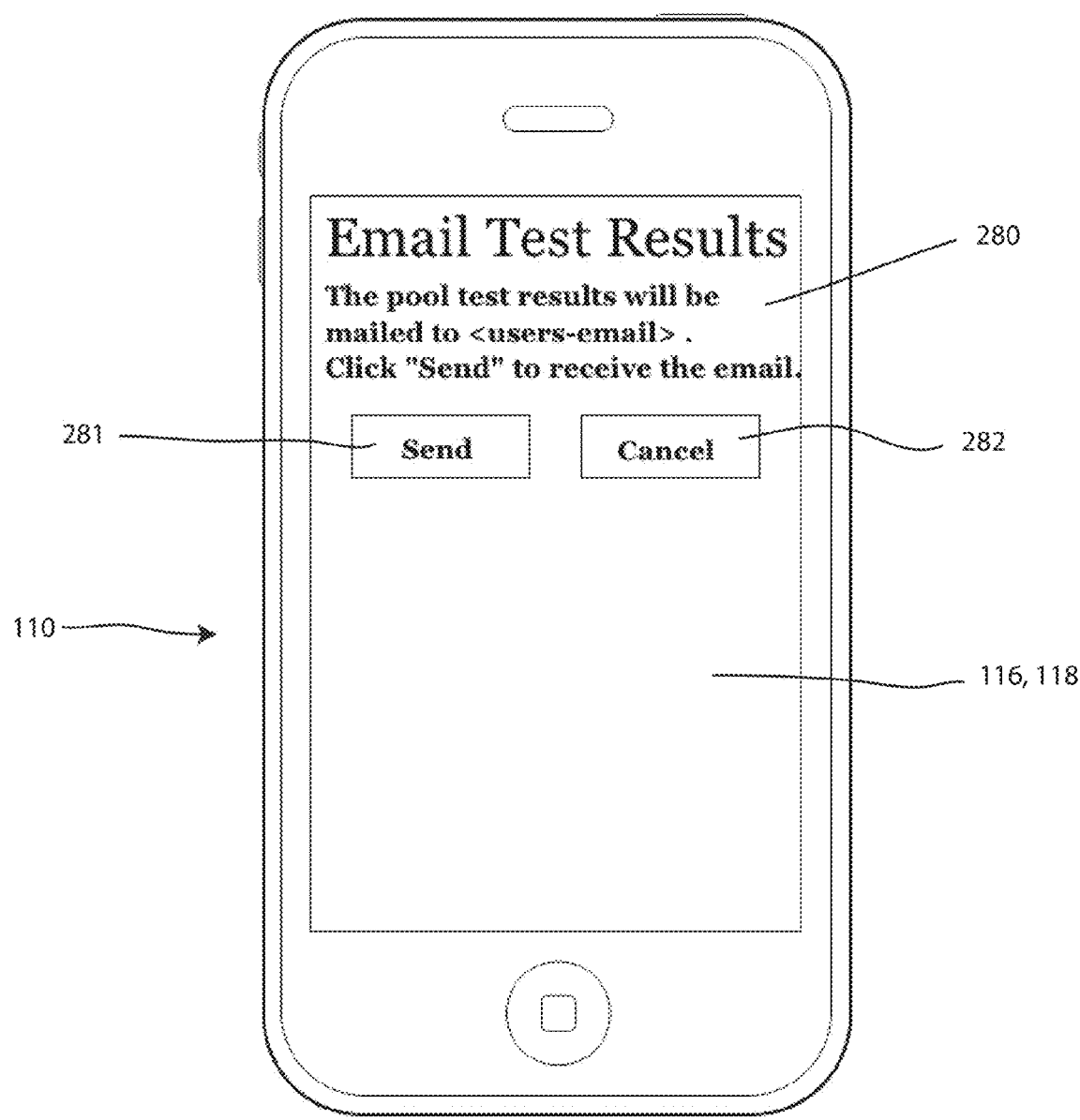
FIG. 19 depicts an email confirmation interface on the display of the user communication device of the system of FIGS. 1-18 according to one embodiment.

Shown in FIG. 19 is one example of an email confirmation interface 280 on the display 116 of the user communication device 110 of the system 100 of FIGS. 1-18. Selecting the email button in the previous interface 270 shown in FIG. 17 may bring up a confirmation screen showing the user the email address(es) where the pool data will be sent. The user may then choose to send the email by pressing a send button 281 or cancel on the email by pressing a cancel button 282. Again, the email may be sent either by the web server 112 after the user communication device 110 requests the email be sent. Alternately, the user communicator 110 may send the email directly from information already stored on the user communicator 110.

Figure 20:
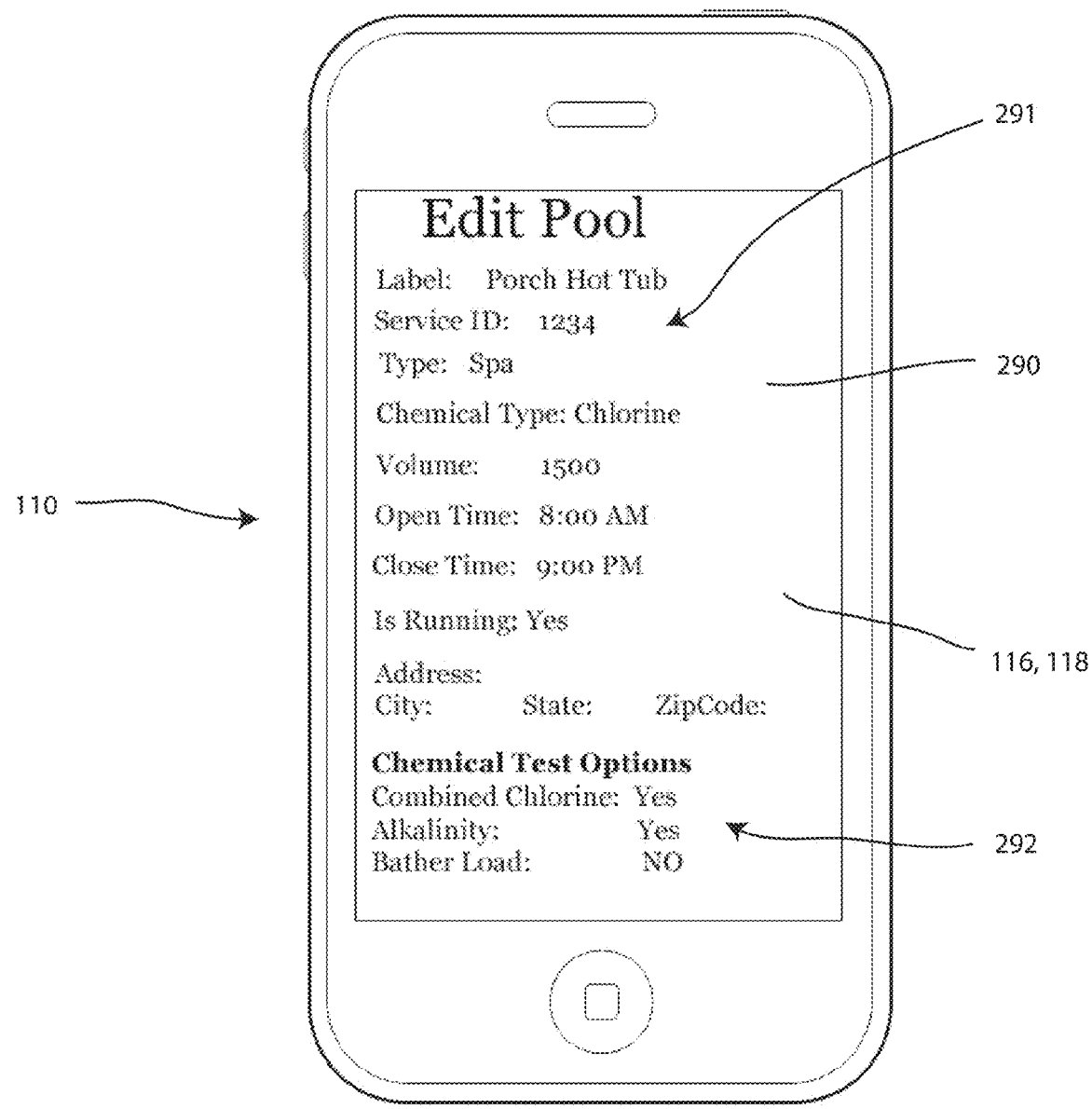
FIG. 20 depicts an edit pool interface the display of the user communication device of the system of FIGS. 1-19 according to one embodiment.

FIG. 20 shows an example of an edit pool interface 290 on the display 116 of the user communication device 110 of the system 100 of FIGS. 1-19. The edit pool interface 290 may allow the user to change the pool settings 291 such as, but not limited to, the chemicals used for the pool and whether the pool is currently operating, label and the open and close times of the pool. The edit pool interface 290 may further allow the user to edit chemical test options 292. Only administrators may have access to the edit pool screen, in one embodiment. This information may be sent by the user communicator 110 to the web server 112 and stored by the web server 112 in the database 114.

FIG. 21 shows an example of a notes recording interface 295 on the display 118 of the user communication device 110 of the system 100 of FIGS. 1-20. The notes recording interface 295 may allow a user to enter a free form note about the pool during the chemical test recording. Notes can then be edited at a later date from either the test recording interface 270 or the pool manager interface 230. The notes recording interface 295 may include an update toggle 296 for storing a note in the system 100 and a cancel toggle 297 for deleting what was written in the note and not storing the note in the system 100.

FIG. 22 shows an example of a pool notes screen 299 on the display 118 of the user communication device 110 of the system 100 of FIGS. 1-21. The pool notes screen 299 displays all of the notes for a given pool to a user. Clicking on an edit 298 button will allow a user to update or delete the selected note by bringing the user back to the notes recording interface 295 described hereinabove, for example.

Figure 23:
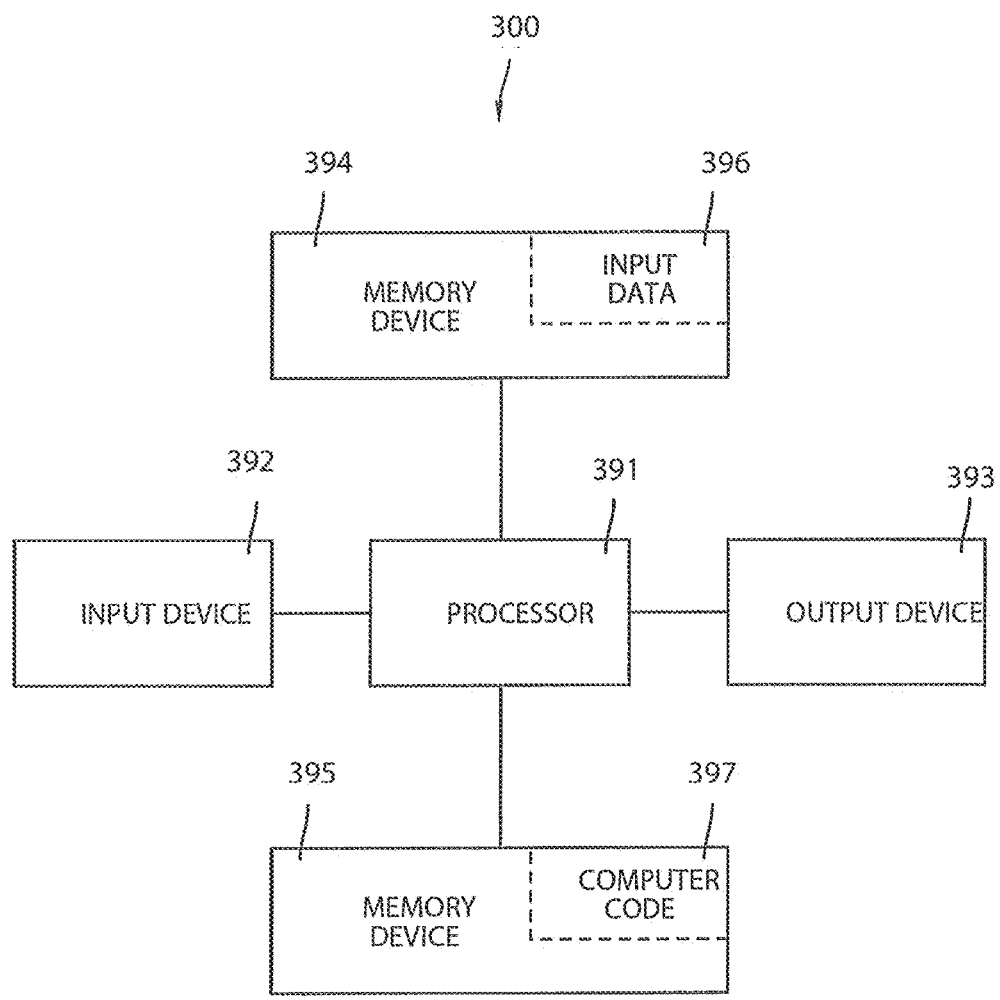
FIG. 23 depicts a representative computer apparatus used in the system of FIGS. 1-22.

FIG. 23 illustrates a computer apparatus 300 used by system 100 of FIGS. 1-22. The computer system 300 may represent either the server 112 or the user communication device 110, or any other computer device that may be found in the system 100. The computer system 300 comprises a processor 391, an input device 392 coupled to the processor 391, an output device 393 coupled to the processor 391, and memory devices 394 and 395 each coupled to the processor 391. The input device 392 may be, inter alia, a keyboard, a mouse, etc. The output device 393 may be, inter alia, a printer, a plotter, a computer screen, a magnetic tape, a removable hard disk, a floppy disk, etc. The memory devices 394 and 395 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 395 includes a computer code 397. The computer code 397 includes algorithms for providing the interfaces described hereinabove in FIGS. 1-22. The processor 391 executes the computer code 397. The memory device 394 includes input data 396. The input data 396 includes input required by the computer code 397. The output device 393 displays output from the computer code 397. Either or both memory devices 394 and 395 (or one or more additional memory devices not shown in FIG. 23) may comprise the algorithms for providing the interfaces described hereinabove in FIGS. 1-19 and may be used as a computer usable medium (or a computer readable medium or a program storage device) having a computer readable program code embodied therein and/or having other data stored therein, wherein the computer readable program code comprises the computer code 397. Generally, a computer program product (or, alternatively, an article of manufacture) of the computer system 300 may comprise the computer usable medium (or said program storage device).

Still yet, any of the components of the present invention could be created, integrated, hosted, maintained, deployed, managed, serviced, etc. by a service supplier who offers to automatically transmitting, receiving, storing, and tracking pool related data. Thus the present invention discloses a process for deploying, creating, integrating, hosting, maintaining, and/or integrating computing infrastructure, comprising integrating computer-readable code into the computer system 300, wherein the code in combination with the computer system 300 is capable of performing a method for a automatically transmitting, receiving, storing, and tracking pool related data. In another embodiment, the invention provides a business method that performs the process steps of the invention on a subscription, advertising, and/or fee basis. That is, a service supplier could offer automatically transmitting, receiving, storing, and tracking In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 23 shows the computer system 300 as a particular configuration of hardware and software, any configuration of hardware and software, as would be known to a person of ordinary skill in the art, may be utilized for the purposes stated supra in conjunction with the particular computer system 300 of FIG. 23. For example, the memory devices 94 and 95 may be portions of a single memory device rather than separate memory devices.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

We claim:

1. A system comprising:
a server hosting a pool data receiving and storage service;
a database in communication with the server; and
a user communication device in communication with the server, the user communication device having an interface configured interact with the pool data receiving and storage service hosted by the server, the interface configured to receive a user input of a pool related data, the interface configured to transmit the pool related data to the server, the pool related data corresponding to chemical levels in a pool;
wherein the database includes pool related data for a plurality of pools, including first pool related data for a first pool;
wherein the pool data receiving and storage service of the server is configured to receive the pool related data from the user communication device and store the pool related data in the database;
wherein the interface of the user communication device is configured to access the pool related data through communication with the server;
wherein the pool related data includes address information for the plurality of pools, including first address information for the first pool;
wherein the system is configured to utilize the first address information for the first pool to integrate with a global positioning system of the user communication device to automatically select the first pool of the plurality of pools based upon a comparison of the first address information of the first pool and a location of a user established by the global positioning system and a determination that the user is proximate to the first pool, wherein the selection of the first pool, based upon a comparison of the first address information of the first pool and the location of the user established by the global positioning system, directs storage of the pool related data into the first pool related data for the first pool.

2. The system of claim 1, wherein the user communication device is a mobile communicator having a display and a user interface.

3. The system of claim 1, wherein a plurality of user communication devices are connectable to the server.

4. The system of claim 1, wherein the server hosts the interface of the user communication device.

5. The system of claim 1, wherein the interface includes a home navigation screen that navigates to a pool interface, a company interface, and a user interface, wherein the pool interface allows an administrator to input pool information, wherein the company interface allows an administrator to input company information, and wherein the user interface allows an administrator to input user information.

6. The system of claim 1, wherein the pool related data is saved in the database with a time stamp, wherein the time stamp includes user information corresponding to a particular user that inputted the user input of the pool related data.

7. The system of claim 1, wherein the interface is configured to recommend amounts of chemicals to add to the pool after receiving the pool related data to bring the pool to an ideal range.

8. The system of claim 1, wherein the database is configured to store a plurality of inputs of a plurality of pool related data corresponding to chemical levels of a plurality of pools from a plurality of user communication devices, and wherein the plurality of inputs are time stamped and accessible for review, and wherein the plurality of pool related data are exportable to an external device that is not one of the plurality of user communication devices.

9. A system comprising:
a web server;
a database in communication with the web server; and
a plurality of mobile communication devices in remote communication with the web server;
wherein the web server is configured to host an interface that is accessible by the plurality of mobile communication devices, wherein the interface permits users of the plurality of mobile communication devices to input pool related data corresponding to chemical levels in a pool, wherein the web server is configured to store the pool related data in the database, wherein the interface is configured to permit the plurality of mobile communication devices to manually access the pool related data stored in the database, wherein the database includes pool related data for a plurality of pools, wherein the pool related data includes address information for the plurality of pools, wherein the system is configured to utilize the address information to integrate with a global positioning system of at least one of the plurality of mobile communication devices to automatically select a first pool of the plurality of pools, wherein a selection of the first pool is based upon a determination that a position of a user, as determined by the global positioning system of the at least one of the plurality of mobile communication devices, is in proximity to the first pool, wherein the selection of the first pool directs storage of the pool related data into a location of the database for the first pool.

10. The system of claim 9, wherein the plurality of mobile communication devices have a display and a user interface.

11. The system of claim 9, wherein the interface includes a home navigation screen that navigates to a pool interface, a company interface, and a user interface, wherein the pool interface allows an administrator to input pool information, wherein the company interface allows an administrator to input company information, and wherein the user interface allows an administrator to input user information.

12. The system of claim 9, wherein the pool related data is saved in the database with a time stamp, wherein the time stamp includes user information corresponding to a particular user that inputted the user input of the pool related data.

13. The system of claim 9, wherein the interface is configured to recommend amounts of chemicals to add to the pool after receiving the pool related data to bring the pool to an ideal range.

14. A method comprising:
providing a web server;
providing a database;
communicating between the web server and the database;
providing a mobile communication device having a global positioning system;
remotely communicating between the mobile communication device and the web server;
hosting, with the web server, an interface;
accessing the interface with the mobile communication device;
inputting into the interface, with the mobile communication device, a first set of pool related data comprising chemical levels in a first pool and address information for the first pool;
receiving the first set of pool related data by the web server;
storing the first set of pool related data in the database such that the first set of pool related data is associated with the first pool;
accessing the interface by the user from the mobile communication device;
utilizing the address information of the first pool to integrate with a global positioning system of the mobile communication device;
automatically selecting the first pool when the global positioning system determines that the mobile communication device is located proximate the first pool;
inputting into the interface, with the mobile communication device, a second set of pool related data comprising chemical levels in the first pool; and
storing the second set of pool related data in the database such that the second set of pool related data is associated with the first pool.

15. The method of claim 14, wherein the interface includes a home navigation screen that navigates to a pool interface, a company interface, and a user interface, wherein the pool interface allows an administrator to input pool information, wherein the company interface allows an administrator to input company information, and wherein the user interface allows an administrator to input user information.

16. The method of claim 14, further comprising storing the pool related data in the database with a time stamp, wherein the time stamp includes user information corresponding to a particular user that inputted the user input of the pool related data.

17. The method of claim 14, further comprising recommending, with the interface, amounts of chemicals to add to the pool after receiving the pool related data by the web server to bring the pool to an ideal range.

* * * * *